(12) United States Patent
Fang et al.

(10) Patent No.: US 9,936,014 B2
(45) Date of Patent: Apr. 3, 2018

(54) METHOD FOR VIRTUAL MACHINE MIGRATION IN COMPUTER NETWORKS

(71) Applicant: Microsoft Technology Licensing, LLC, Redmond, WA (US)

(72) Inventors: Luyuan Fang, Holmdel, NJ (US); Fabio Chiussi, Holmdel, NJ (US); Vijay Gill, Bellevue, WA (US); Deepak Bansal, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 14/555,881

(22) Filed: Nov. 28, 2014

(65) Prior Publication Data

US 2016/0119417 A1    Apr. 28, 2016

Related U.S. Application Data

(60) Provisional application No. 62/068,711, filed on Oct. 26, 2014.

(51) Int. Cl.
*G06F 15/16* (2006.01)
*H04L 29/08* (2006.01)
(Continued)

(52) U.S. Cl.
CPC ...... *H04L 67/1095* (2013.01); *G06F 9/45558* (2013.01); *H04L 12/4633* (2013.01);
(Continued)

(58) Field of Classification Search
None
See application file for complete search history.

(56) References Cited

U.S. PATENT DOCUMENTS

| | | |
|---|---|---|
| 5,493,716 A | 2/1996 | Bane |
| 7,095,740 B1 | 8/2006 | Jagannath et al. |

(Continued)

FOREIGN PATENT DOCUMENTS

| | | |
|---|---|---|
| EP | 1962192 A1 | 8/2008 |
| WO | 2012168795 A1 | 12/2012 |
| WO | 2013184846 A1 | 12/2013 |

OTHER PUBLICATIONS

"International Search Report and Written Opinion Issued in PCT Application No. PCT/US2015/057032", dated Feb. 17, 2016, 13 Pages.

(Continued)

Primary Examiner — Younes Naji
(74) Attorney, Agent, or Firm — Liang IP, PLLC

(57) ABSTRACT

Various techniques for virtual entity migration in a computer network is disclosed herein. In one embodiment, a method includes receiving an indication to migrate a virtual machine in a virtual network from an originating network node of the underlay network to a target network node of the underlay network. The method also includes establishing a network tunnel in the underlay network from the originating network node to the target network node in response to receiving the indication to migrate the virtual machine. The method further includes migrating the virtual machine from the originating network node to the target network node following the established network tunnel in the underlay network while maintaining an address of the migrated virtual machine in the virtual network.

20 Claims, 10 Drawing Sheets

(51) Int. Cl.
- *G06F 9/455* (2018.01)
- *H04L 12/46* (2006.01)
- *H04L 12/751* (2013.01)
- *H04L 12/24* (2006.01)

(52) U.S. Cl.
CPC ........ *H04L 12/4641* (2013.01); *H04L 41/082* (2013.01); *H04L 41/12* (2013.01); *H04L 45/02* (2013.01); *H04L 67/16* (2013.01); *G06F 2009/4557* (2013.01)

(56) References Cited

U.S. PATENT DOCUMENTS

| | | |
|---|---|---|
| 7,346,279 B1 | 3/2008 | Li et al. |
| 7,580,399 B2 | 8/2009 | Hart |
| 7,974,220 B2 | 7/2011 | Elias et al. |
| 7,996,510 B2 | 8/2011 | Vicente |
| 8,233,489 B2 | 7/2012 | Welin et al. |
| 8,473,557 B2 | 6/2013 | Ramakrishnan et al. |
| 8,553,663 B2 | 10/2013 | Harmatos et al. |
| 8,645,576 B2 | 2/2014 | Farinacci et al. |
| 8,705,513 B2 | 4/2014 | Van Der Merwe et al. |
| 8,730,980 B2 | 5/2014 | Bagepalli et al. |
| 8,804,745 B1 | 8/2014 | Sinn |
| 8,966,027 B1 | 2/2015 | Brandwine et al. |
| 2007/0060150 A1 | 3/2007 | Hart |
| 2007/0104119 A1 | 5/2007 | Sarkar et al. |
| 2007/0180436 A1 | 8/2007 | Travostino et al. |
| 2009/0037607 A1 | 2/2009 | Farinacci et al. |
| 2010/0214944 A1 | 8/2010 | Elias et al. |
| 2010/0287548 A1* | 11/2010 | Zhou ............... G06F 9/4856 718/1 |
| 2010/0322255 A1 | 12/2010 | Hao et al. |
| 2012/0224583 A1 | 9/2012 | Sergeev et al. |
| 2013/0031544 A1 | 1/2013 | Sridharan et al. |
| 2013/0034094 A1 | 2/2013 | Cardona et al. |
| 2013/0047151 A1 | 2/2013 | Sridharan et al. |
| 2013/0086298 A1 | 4/2013 | Alanis et al. |
| 2013/0129348 A1 | 5/2013 | Mak et al. |
| 2013/0198558 A1 | 8/2013 | Rao et al. |
| 2013/0223454 A1 | 8/2013 | Dunbar et al. |
| 2013/0227108 A1 | 8/2013 | Dunbar et al. |
| 2013/0238802 A1 | 9/2013 | Sarikaya |
| 2013/0262647 A1 | 10/2013 | Kurita et al. |
| 2014/0006585 A1 | 1/2014 | Dunbar et al. |
| 2014/0037032 A1 | 2/2014 | Yan et al. |
| 2014/0068045 A1* | 3/2014 | Tarui ............... H04L 41/02 709/223 |
| 2014/0071990 A1 | 3/2014 | Banavalikar et al. |
| 2014/0086253 A1 | 3/2014 | Yong |
| 2014/0108584 A1 | 4/2014 | Lu |
| 2014/0112349 A1 | 4/2014 | Moreno et al. |
| 2014/0161131 A1 | 6/2014 | Yang et al. |
| 2014/0195666 A1 | 7/2014 | Dumitriu et al. |
| 2014/0201733 A1 | 7/2014 | Benny et al. |
| 2014/0215010 A1 | 7/2014 | Liang et al. |
| 2014/0229944 A1 | 8/2014 | Wang et al. |
| 2014/0241247 A1 | 8/2014 | Kempf et al. |
| 2014/0244851 A1 | 8/2014 | Lee |
| 2014/0269712 A1 | 9/2014 | Kidambi |
| 2015/0052521 A1 | 2/2015 | Raghu |
| 2015/0100958 A1 | 4/2015 | Banavalikar et al. |
| 2015/0121372 A1 | 4/2015 | Hatta et al. |
| 2015/0172183 A1* | 6/2015 | DeCusatis ........... H04L 12/4633 370/392 |
| 2015/0195178 A1* | 7/2015 | Bhattacharya ........ H04L 45/745 718/1 |
| 2015/0281099 A1 | 10/2015 | Banavalikar |
| 2015/0319088 A1 | 11/2015 | Wenig |
| 2015/0326467 A1 | 11/2015 | Fullbright et al. |
| 2015/0350061 A1 | 12/2015 | Chunduri et al. |
| 2015/0355934 A1 | 12/2015 | Yin et al. |
| 2015/0365324 A1 | 12/2015 | Kumar et al. |
| 2016/0036695 A1 | 2/2016 | Mirsky et al. |
| 2016/0094650 A1 | 3/2016 | Garcia de Rio |
| 2016/0105408 A1 | 4/2016 | Cooper et al. |
| 2016/0191341 A1 | 6/2016 | Sivasankaran |
| 2016/0234673 A1 | 8/2016 | Fujinami |

OTHER PUBLICATIONS

"Configuring Network Virtualization Segments", Retrieved from <<https://support.f5.com/kb/en-us/products/big-ip_ltm/manuals/product/bigip-tmos-tunnels-ipsec-11-6-0/1.print.html>>, Retrieved Date: Nov. 5, 2014, 9 Pages.

"Data Center Overlay Technologies", In Network General, White Paper of Cisco, Nov. 15, 2013, 10 Pages.

"Press Release: Packet Design to Address SDN/MPLS Conference on Urgency of SDN Analytics", Retrieved from <<http://web.archive.org/web/20141031084047/http://www.packetdesign.com/news-and-events/press-release-packet-design-to-address-sdn-mpls-conference-on-urgency-of-sdn-analytics>>, Oct. 28, 2014, 3 Pages.

"Supporting Migration of Virtual Machines Running Multi-tier Applications in Computing Clouds that Span multiple IP Address Ranges", An IP.com Prior Art Database Technical Disclosure, IP.com No. IPCOM000198971D, Aug. 19, 2010, 7 Pages.

"Final Office Action Issued in U.S. Appl. No. 14/555,865", dated Sep. 29, 2016, 22 Pages.

"Non Final Office Action Issued in U.S. Appl. No. 14/555,865", dated Mar. 7, 2016, 20 Pages.

"Final Office Action Issued in U.S. Appl. No. 14/555,877", dated Sep. 14, 2016, 22 Pages.

"Non Final Office Action Issued in U.S. Appl. No. 14/555,877", dated Mar. 29, 2016, 16 Pages.

Afanasiev, et al., "MPLS in DC and Inter-De Networks: The Unified Forwarding Mechanism for Network Programmability at Scale", Retrieved from <<https://web.archive.org/web/20140623062010/http://www.slideshare.net/DmitryAfanasiev1/yandex-nag201320131031>>, Mar. 12, 2014, 5 Pages.

Aggarwal, et al., "Data Center Mobility Based on E-VPN, BGP/MPLS IP VPN, IP Routing and NHRP", In Network Working Group, Internet Draft, Jun. 2, 2014, 25 Pages.

Ando, et al., "Network Virtualization for Large-Scale Data Centers", In Fujitsu Scientific & Technical Journal, vol. 49, Issue 3, Jul. 2013, pp. 292-299.

Asghar, et al., "A Virtual Network Solution for Service Mobility", In Proceedings 4th Joint IFIP of Wireless and Mobile Networking Conference (WMNC), Oct. 26, 2011, 6 Pages.

Dam, et al., "Location Independent Routing in Process Network Overlays", In Proceedings of 22nd Euromicro International Conference on Parallel, Distributed and Network-Based Processing (PDP), Feb. 12, 2014, pp. 715-724.

Fang, et al., "MPLS-Based Hierarchical SDN for Hyper-Scale DC/Cloud", In Internet-Draft, Intended Status: Standards Track, Oct. 27, 2014, 25 Pages.

Jiang, et al., "VIOLIN: Virtual Internetworking on Overlay Infrastructure", In Proceedings of the Second International Conference on Parallel and Distributed Processing and Applications, Dec. 13, 12004, 10 Pages.

Keller, et al., "Live Migration of an Entire Network (and its Hosts)", In Proceedings of the 11th ACM Workshop on Hot Topics in Networks, Oct. 29, 2012, 14 Pages.

Kompella, Kireeti, "New Take on SDN: Does MPLS Make Sense in Cloud Data Centers?", Retrieved from <<https://www.sdxcentral.com/articles/contributed/does-mpls-make-sense-in-cloud-data-centers/2012/12/>>, Dec. 11, 2012, 10 Pages.

Liebeherr, Jorg, "Addressing and Routing in Multi-substrate Overlay Networks", Retrieved from <<http://www.slideserve.com/raoul/addressing-and-routing-in-multi-substrate-overlay-networks>>, Retrieved Date: Nov. 3, 2014, 6 Pages.

Miniman, Stuart, "Networking in Hyperscale Environments", Retrieved from <<http://wikibon.org/wiki/v/Networking_in_Hyperscale_Environments>>, May 2014, 5 Pages.

Narten, et al., "Problem Statement: Overlays for Network Virtualization", In Internet Engineering Task Force (IETF), Request for Comments: 7364, Oct. 2014, 24 Pages.

(56) References Cited

OTHER PUBLICATIONS

"International search Report and Written Opinion Issued in PCT Application No. PCT/US2015/057030", dated Feb. 17, 2016, 13 Pages.

"International Search Report and Written OpinionIssued in PCT Application No. PCT/US2015/057031", dated Jan. 25, 2016, 11 Pages.

"Second Written Opinion Issued in PCT Application No. PCT/US2015/057031", dated Jun. 21, 2016, 5 Pages.

"Second Written Opinion Issued in PCT Application No. PCT/US2015/057032", dated Sep. 16, 2016, 10 Pages.

Ramakrishnan, et al., "Live Data Center Migration across WANs: A Robust Cooperative Context Aware Approach", In Proceedings of the SIGCOMM workshop on Internet Network Management, Aug. 27, 2007, 6 Pages.

Singla, et al., "OpenContrail Architecture Document", Retrieved from <<http://www.opencontrail.org/opencontrail-architecture-documentation/>>, Nov. 19, 2013, 36 Pages.

Travostino, et al., "Seamless Live Migration of Virtual Machines over the MAN/WAN", In Journal of Future Generation Computer Systems, vol. 22, Issue 8, Oct. 2006, pp. 901-907.

Wood, et al., "CloudNet: Dynamic Pooling of Cloud Resources by Live WAN Migration of Virtual Machines", In Proceedings of the 7th ACM SIGPLAN/SIGOPS International Conference on Virtual Execution Environments, Mar. 9, 2011, 12 Pages.

Kempf, et al., "Zeppelin—A Third Generation Data Center Network Virtualization Technology based on SDN and MPLS", In IEEE 2nd International Conference on Cloud Networking, Nov. 11, 2011, 9 pages.

Crisan, et al., "Got Loss? Get zOVN!", In Proceedings of the ACM SIGCOMM conference on SIGCOM, Aug. 12, 2013, pp. 423-434.

"Networking innovations for HP ProLiant Gen9 servers", In Techinical White paper, Retrieved on: Nov. 3, 2014, 9 pages.

"Cisco Open Network Environment: Network Programmability and Virtual Network Overlays", Retrieved on: Nov. 3, 2014 Available at: http://www.cisco.com/c/en/us/products/collateral/ios-nx-os-software/white_paper_c11-707978.html.

"International Preliminary Report on Patentability Issued in PCT Application No. PCT/US2015/057032", dated Dec. 13, 2016, 11 Pages.

"Non Final Office Action Issued in U.S. Appl. No. 14/555,865", dated Mar. 9, 2017, 16 Pages.

"Final Office Action Issued in U.S. Appl. No. 14/555,877", dated Jun. 7, 2017, 19 Pages.

"Non Final Office Action Issued in U.S. Appl. No. 14/555,877", dated Jan. 5, 2017, 16 Pages.

"International Preliminary Report on Patentability Issued in PCT Application No. PCT/US2015/057030", dated Dec. 22, 2016, 8 Pages.

"International Preliminary Report on Patentability Issued in PCT Application No. PCT/US2015/057031", dated Jan. 23, 2017, 7 Pages.

"Notice of Allowance Issued in U.S. Appl. No. 14/555,865", dated Nov. 6, 2017, 7 Pages.

* cited by examiner

METHOD FOR VIRTUAL MACHINE MIGRATION IN COMPUTER NETWORKS

CROSS-REFERENCE TO RELATED APPLICATION(S)

This application is a non-provisional application of U.S. provisional application No. 62/068,711, filed Oct. 26, 2014, the disclosure of which is incorporated herein in its entirety.

BACKGROUND

Computer networks can have a large number of physical servers interconnected with one another in an underlay network by routers, switches, bridges, or other network devices via wired or wireless network links. Each physical server can host multiple virtualized servers or virtual network functions interconnected with one another in one or more virtual overlay networks supported by the underlay network. Network nodes and network end points of the virtual overlay networks can exchange messages via the underlay network in accordance with one or more network protocols.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One difficulty associated with designing and operating computer networks is scalability. As the numbers of physical and/or virtualized servers increase, the amount of requisite resources as well as operational complexity rapidly increase. For example, virtual machines can be relocated from one physical server to another due to a power system failure, load balancing, and/or other reasons. New addresses of the relocated virtual machines are updated to other virtual machines in corresponding virtual networks. However, as the number of virtual machines reaches millions or tens of millions, such address updating can involve a large amount of information and can take a considerable amount of time during which communications with the relocated virtual machines can be unreliable. Thus, service interruptions or even system failure can occur.

Several embodiments of the disclosed technology can improve scalability of computer networks by partitioning an overlay network into overlay partitions with manageable sizes. Each overlay partition can independently manage and/or update reachability information only for virtual networks with at least one end point in the overlay partition. For virtual networks without any end points in an overlay partition, the overlay partition does not manage any reachability information related to such virtual networks. Thus, each overlay partition can operate independently from others to achieve fast reachability update of virtual machines, virtual network functions, and/or other suitable end points.

DETAILED DESCRIPTION

Figure 1:
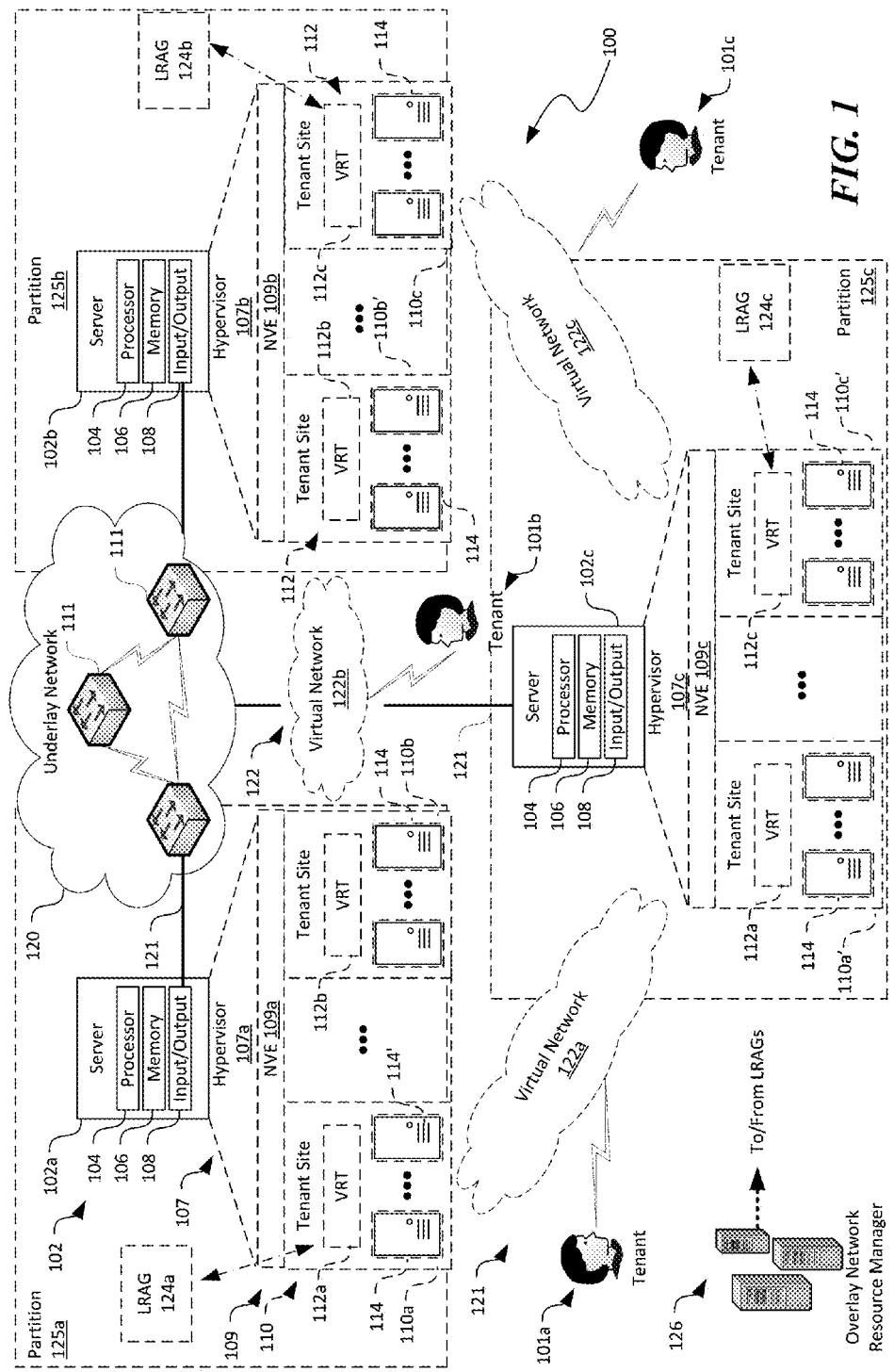
FIG. 1 is a schematic diagram illustrating a computer network having overlay network partitioning in accordance with embodiments of the disclosed technology.

Certain embodiments of systems, devices, components, modules, routines, and processes for partitioning, managing, and/or updating overlay networks are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-12.

As used herein, the term "computer network" generally refers to an interconnection network having a plurality of network nodes that connect a plurality of end points to one another and to other networks (e.g., the Internet). The term "network node" generally refers to a physical and/or software emulated (or virtual) network device. Example network nodes include routers, switches, hubs, bridges, load balancers, security gateways, firewalls, network name translators, or name servers.

A computer network supporting virtual or physical network devices, network nodes, and network end points can be conceptually divided into an overlay network implemented over an underlay network. An "overlay network" generally refers to an abstracted network implemented over and operating on top of an underlay network, which can include multiple physical network nodes interconnected with one another and with physical end points. For example, an overlay network can include one or more virtual networks implemented over an underlay network. The virtual networks interconnect multiple physical servers or virtualized servers hosted on different physical servers interconnected by physical network nodes in the underlay network. Virtual network nodes in the overlay network can be connected to one another by virtual or logical links individually corresponding to one or more paths along one or more physical network nodes in the underlay network.

A "virtual network" generally refers to an abstraction of a portion of the underlay network in the overlay network. A virtual network can include one or more virtual end points referred to as "tenant sites" individually used by a user or "tenant" to access the virtual network and associated computing, storing, or other suitable resources. A tenant site can host one or more tenant end points ("TEPs"), for example, virtual machines. A tenant site can also include a virtual routing table ("VRT") containing reachability information for routing messages among TEPs in a particular virtual network. For example, reachability information can include a mapping of a virtual end point to an address of a network node in the underlay network at which the virtual end point currently resides.

A "network virtualization edge" or "NVE" generally refers to a network entity at an edge of the underlay network to connect one or more tenant sites to their respective virtual networks. In one example, a network virtualization edge in a virtual private network ("VPN") based on a multi-protocol label switching network ("MPLS") is a VPN provider edge. A "virtualized network function" or "VNF" generally refers to a network function implemented in an overlay network and residing in a server or a network node. Example VNFs include a software load balancer, a virtual firewall, and a virtual network name translator.

The term "end point" generally refers to a physical or software emulated computing device. Example end points include network servers, network storage devices, personal computers, mobile computing devices (e.g., smartphones), network functions virtualization, or virtual machines. Each end point can be associated with an end point identifier that can have a distinct value in a computer network. Examples of end point identifiers (or network node identifiers) can include at least a portion of a label used in a MPLS network, a stack of labels used in a MPLS network, one or more addresses according to the Internet Protocol ("IP"), one or more virtual IP addresses, one or more tags in a virtual local area network, one or more media access control addresses, one or more Lambda identifiers, one or more connection paths, one or more physical interface identifiers, or one or more packet headers or envelopes.

The term "domain" generally refers to a physical or logical partition of an underlay network. A domain can include a select number of network nodes interconnected with one another and/or with a number of end points in the underlay network. A domain can also be connected to one or more higher-level domains that include a number of additional network nodes that connect the particular domain to other domains at the same or different levels in a hierarchy of domains. In certain embodiments, a software defined network ("SDN") can be used to dividing the underlay network into multiple domains. In other embodiments, one or more of the domains of the underlay network can be at least partially a distributed computer network that use distributed routing and/or forwarding protocols.

Computer networks such as those used in large-scale datacenters can be difficult to design and/or operate. As the number of physical and/or virtualized servers increases, the amount of requisite resource or operational complexity rapidly increases. For example, updating addresses of started, relocated, or terminated virtual machines can involve a large amount of information and can take a large amount of time when a number of virtual machines reaches millions or tens of millions. During such address update, messages to the relocated virtual machines may still be routed to previous addresses of the relocated virtual machines, and thus can be lost. Such unreliable communications can result in service interruptions or even system failure. Several embodiments of the disclosed technology can address at least some of the foregoing scaling and/or updating drawbacks by partitioning an overlay network into overlay partitions. As such, computer networks can be scaled up by including additional overlay partitions that each independently manages reachability information. As a result, address update can be completed or "converged" more rapidly than conventional techniques, and thus reducing the risk of communication interruptions.

Management of reachability information in an overlay network can also place additional demands on an underlay network supporting the overlay network. Virtual network routing and end state information are typically propagated among end points in each virtual network using a control plane of the underlay network. For example, instead of just one network route per physical server, control plane protocols of the underlay network may have to announce all virtual network routes for all virtual networks hosted on the physical server. When a computer network is scaled to support hundreds or even millions of virtual machines attached to a large number of virtual networks, the sheer volume of the reachability information to be maintained and propagated constitutes a major challenge.

FIG. 1 is a schematic diagram illustrating a computer network 100 having overlay network partitioning in accordance with embodiments of the disclosed technology. As shown in FIG. 1, the computer network 100 can include a underlay network 120 and an overlay network 121 implemented over and operating on top of the underlay network 120. In the illustrated embodiment, the overlay network 121 is shown to include first, second, and third virtual networks 112a, 112b, and 112c for illustration purposes. In other embodiments, the overlay network 121 can include any other suitable number of virtual networks and/or virtual network functions (not shown).

As shown in FIG. 1, the underlay network 120 can include a plurality of network nodes 111 (three are shown for illustration purposes) interconnecting multiple servers 102 (shown as first, second, and third servers 102a-102c, respectively). The servers 102 can individually include a processor 104 coupled to a memory 106 and an input/output component 108. The processor 102 can include a microprocessor, a field-programmable gate array, and/or other suitable logic devices. The memory 104 can include non-transitory volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 102 (e.g., instructions for performing the methods discussed below with reference to FIGS. 7-11). The input/output component 108 can include a display, a touch screen, a keyboard, a mouse, a printer, and/or other suitable types of input/output devices configured to accept input from and provide output to an operator and/or an automated software controller (not shown). Even though the underlay network 120 is shown in FIG. 1 as having a planar network structure, in certain embodiments, the underlay network 120 can be organized into multiple hierarchical domains, as described in more detail below with reference to FIG. 2. In further embodiments, the underlay network 120 can be organized in other suitable manners.

The servers 102 can individually contain instructions in the memory 106 that when executed by the processors 102, cause the individual processors 102 to provide a hypervisor 107 and an NVE 109. The hypervisors 107 can individually be configured to generate, monitor, terminate, and/or otherwise manage one or more virtual machines 114 organized into tenant sites 110. For example, as shown in FIG. 1, the first server 102a can provide a first hypervisor 107a that manages first and second tenant sites 110a and 110b, respectively. The second server 102b can provide a second hypervisor 107b that manages second and third tenant sites 110b' and 110c, respectively. The third server 102c can provide a hypervisor 107c that manages first and third tenant sites 110a' and 110c', respectively. The tenant sites 110 can each include one or more virtual machines 114 and/or virtual network functions (not shown). The hypervisors 107 are individually shown in FIG. 1 as a software component. However, in other embodiments, the hypervisors 107 can each be a firmware and/or hardware component. The NVE 109 can be configured to connect one or more tenant sites 110 to their respective virtual networks 122. Even though the NVE 109 is shown as a separate software component in FIG. 1, in further embodiments, the NVE 109 can be integral to or forms a portion of the corresponding hypervisor 107.

As shown in FIG. 1, the different servers 102 can individually host a tenant site 110 that includes multiple virtual machines 114 for a particular tenant 101 (identified as first, second, and third tenants 101a, 101b, and 101c, respectively). For example, the first server 102a and the third server 102c can both host the tenant site 110a and 110a' for a first tenant 101a. The first server 102a and the second server 102b can both host the tenant site 110b and 110b' for a second tenant 101b. The second server 102b and the third server 102c can both host the tenant site 110c and 110c' for a third tenant 101c. Each virtual machine 114 can be executing a corresponding operating system, middleware, and/or applications.

The overlay network 121 can include one or more virtual networks 122 that interconnect the tenant sites 110 of a particular tenant 101 across multiple servers 102. For example, a first virtual network 122a interconnects the first tenant sites 110a and 110a' at the first server 102a and at the third server 102c. A second virtual network 122b interconnects the second tenant sites 110b and 110b' at the first server 102a and at the second server 102b. A third virtual network 122c interconnects the third tenant sites 110c and 110c' at the second server 102b and at the third server 102c. Even though one virtual network 122 is shown as corresponding to one tenant 101, in other embodiments, multiple virtual networks 122 may be assigned to correspond to a single tenant 101.

The virtual machines 114 on a particular virtual network 122 can communicate with one another via the virtual network 122 even though the virtual machines 114 are hosted on different servers 102. For example, the virtual machines 114 of the first tenant site 110a on the first server 102a can communicate with other virtual machines 114 of the first tenant site 110a' on the third server 102c based at least in part on the first VRT 112a for the first virtual network 122a. In another example, the virtual machines 114 of the second tenant site 110b on the first server 102a can communicate with other virtual machines 114 of the second tenant site 110b' on the second server 102b based at least in part on the second VRT 112b for the second virtual network 122b. Communications of each of the virtual networks 122 though can be isolated from other virtual networks 122. In certain embodiments, communications can be allowed to cross from one virtual network 122 to another through a security gateway or otherwise in a controlled fashion. The VRTs 112 can individually contain tenant addresses each include a virtual network identifier corresponding to a virtualized end point or network node in a particular virtual network 122. Thus, different virtual networks 122 may use one or more same virtual network identifiers and/or identifier values. As a result, a tenant can use his/her own address space in each virtual network, which may overlap with an address space of other tenants and/or with an address space used within a data center by the data center provider. Example virtual network identifiers can include IP addresses, MAC addresses, and/or other suitable addresses. In other embodiments, communications of the different virtual networks 122 may be isolated in other suitable manners.

Each of the virtual networks 122 can also allow the individual tenants 101 to access the corresponding tenant sites 110 via the underlay network 120 and/or other suitable networks (e.g., the Internet). For example, the first tenant 101a can access one of the virtual machines 114 at either the first tenant site 110a or 110a' hosted by the first server 102a or third server 102c, respectively. The second tenant 101b can access one of the virtual machines 114 at either the second tenant site 110b or 110b' hosted by the first server 102a or second server 102b, respectively. The third tenant 101c can access one of the virtual machines 114 at either the third tenant site 110c or 110c' hosted by the second server 102b or third server 102c, respectively.

During operation, virtual machines 114 at a particular tenant site 110 may need to be relocated and be hosted by a different server 102. For example, one or more virtual machines 114 at the first tenant site 110a may need to be relocated to the third server 102c due to system maintenance of the first server 102a or other suitable reasons. During the relocation, the relocated virtual machines 114 can maintain their respective virtual network identifiers (e.g., IP addresses or MAC addresses) in the first virtual network 122a. However, physical locations of these virtual machines 114, as identified by, for example, by underlay network addresses need to be updated from the first server 102a to the third server 102c. As discussed above, updating the other virtual machines 144 in the same virtual network 122 with the new network addresses of the relocated virtual machines 114 can be time consuming, and can result in communication and/or system failures.

Several embodiments of the disclosed technology can reduce the amount of time needed to update network addresses of the relocated virtual machines 114, a started new virtual machine, a terminated virtual machine, a newly configured virtual machine, or other virtual network functions (not shown) by (1) logically partitioning the overlay network 121 and (2) independently updating reachability information on a partition-by-partition basis. For example, as shown in FIG. 1, the overlay network 121 is partitioned based on the servers 102 into overlay partitions 125 (identified individually as first, second, and third overlay partition 125a-125c, respectively) each including an assigned local reachability access gateway ("LRAG") 124. For instance, the first server 102a is associated with a first partition 125a with a first LRAG 124a. The second server 102a is associated with a second partition 125b with a second LRAG

124b. The third server 102a is associated with a third partition 125c with a third LRAG 124c.

Even though the overlay partitions 125 shown in FIG. 1 are divided based on the servers 102, in other embodiments, the overlay partitions 125 can also be divided based on a physical location of one or more of the servers 102, the virtual networks 122, a subset of virtual machines 114, the tenant sites 110, combinations of the foregoing, or can be based on other suitable physical and/or logical entities. Another example mode of dividing the overlay network 121 is discussed in more detail below with reference to FIG. 5.

The LRAGs 124 can be configured to independently populate, update, and/or otherwise manipulate the VRTs 112 in tenant sites 110 only for virtual networks 122 with at least one end point (e.g., a virtual machine 114) in the corresponding overlay partition 125. For example, the first LRAG 124a can be configured to manipulate the first and second VRTs 112a and 112b associated with the first and second tenants 101a and 101b interconnected by the first and second virtual networks 122a and 122b, respectively. The second LRAG 124b can be configured to manipulate the second and third VRTs 112b and 112c associated with the second and third tenants 101a and 101b interconnected by the second and third virtual networks 122b and 122c, respectively. The third LRAG 124c can be configured to manipulate the first and third VRTs 112a and 112c associated with the first and third tenants 101a and 101c interconnected by the first and third virtual networks 122a and 122c, respectively. As such, each LRAG 124 is configured to manage and update VRTs 112 for a limited number of virtual networks 122. The number of virtual networks 122 corresponding to each LRAG 124 can be selected to have a manageable size. For example, in the embodiment shown in FIG. 1, each LRAG 124 corresponds to two virtual networks 122. In other embodiments, each LRAG 124 can correspond to one, three, four, five, six, or any other suitable number of virtual networks 122. In the foregoing embodiments, the LRAG 124 can be configured to manipulate the VRTs 112 directly, through the hypervisors 107, through a separate agent in the servers 102, or through a combination of distributed protocols and corresponding processes in the servers 102.

In certain embodiments, the LRAGs 124 can also be configured to instantiate, modify, terminate, and/or otherwise manage the virtual machines 114 in a corresponding overlay partition 125 in cooperation with the corresponding hypervisor 107. For example, the first LRAG 124a can cause the first hypervisor 107a to instantiate one or more virtual machines 114 for the first tenant site 110a, for the second tenant site 110b, or both. In another example, the first LRAG 124a can also cause the first hypervisor 107 to terminate one or more virtual machines 114 for the first tenant site 110a, for the second tenant site 110b, or both. In other embodiments, the foregoing functionality can be performed by other suitable software, firmware, and/or hardware components of the corresponding servers 102.

In the illustrated embodiment, the LRAGs 124 are shown as software components independent from corresponding servers 102. In other embodiments, the LRAGs 124 can also include firmware and/or hardware components. In certain embodiments, the LRAGs 124 can be hosted by one or more additional servers (not shown) of the computer network 100. In other embodiments, at least one LRAG 124 (e.g., the first LRAG 124a) can be hosted by a corresponding server 102 (e.g., the first server 102a). In further embodiments, the LRAGs 124 can be hosted by one or more of the network nodes 111 and/or other suitable components of the underlay network 120. In yet further embodiments, the LRAGs 124 can have any combinations of the foregoing embodiments and/or other suitable components in suitable arrangements.

The computer network 100 can also include an overlay network resource manager 126 operatively coupled to the LRAGs 124. The overlay network resource manager 126 can be configured to allocate physical resources of the computer network 100 to a particular virtual machine 114, a tenant site 110, a virtual network 122, a combination of the foregoing, or other suitable entities. For example, in one embodiment, the overlay network resource manager 126 can allocate resources of the first server 102a to one or more virtual machines 114 associated with the first tenant site 110a. In another example, the overlay network resource manager 126 can allocate resources of the second server 102a to the same one or more virtual machines 114.

The overlay network resource manager 126 can also be configured to communicate reachability information with the LRAGs 124 associated with certain overlay partitions 125. Example reachability information can include, for example, a underlay location identifier or underlay network address that identifies a physical server (e.g., the first server 102a) and/or a network device 111 of the underlay network 120 on which the virtual machine 114' is hosted. The underlay location identifier or underlay network address can include at least one of (or a combination of) a MPLS Label or a portion of a MPLS label, a stack of ordered MPLS labels, one or more IPv4 addresses, one or more IPv6 addresses, one or more Virtual IP addresses, one or more VLAN tags, one or more MAC addresses, one or more Lambda identifiers, one or more connection paths leading to the end point, one or more physical interface identifiers, one or more sets of bits, one or more packet headers or envelopes, or other suitable location identifiers.

The reachability information can also include a virtual network identifier of the virtual machine 114' on the first virtual network 122a, routes through the underlay network 120 to reach the virtual machine 114', and/or other suitable transmission information. In certain embodiments, the transmission information can include quality of service information such as how a packet is processed or queued at the network devices 111 of the underlay network 120. In other embodiments, the transmission information can include information on whether the packet is to undergo a deep packet inspection, undergo a network function (e.g., firewall, load balancer, etc.) associated with service chaining. Based on the reachability information, the LRAGs 124 can populate and/or update entries in corresponding VRTs 112 in a timely fashion, and thus reducing the risk of communication interruptions and/or system failure. Several examples of the operations of the overlay network resource manager 126 and the LRAGs 124 are described in more detail below with reference to FIGS. 3-5. In other embodiments, the LRAGs 124 can populate and/or update entries in corresponding VRTs 112 with only the addresses, routes, and identifiers used in the overlay network 121. The mapping of such addresses, routes, and identifiers to the addresses and identifiers used in the underlay network 120 to identify the physical host at which the destination virtual machine 114 resides may be performed by a separate software, firmware, and/or hardware entity residing in or separate from the server 102. In certain embodiments, the LRAGs 124 can configure such separate entity with the mapping information. In other embodiments such separate entity can be configured by a different management entity (not shown).

Figure 2:
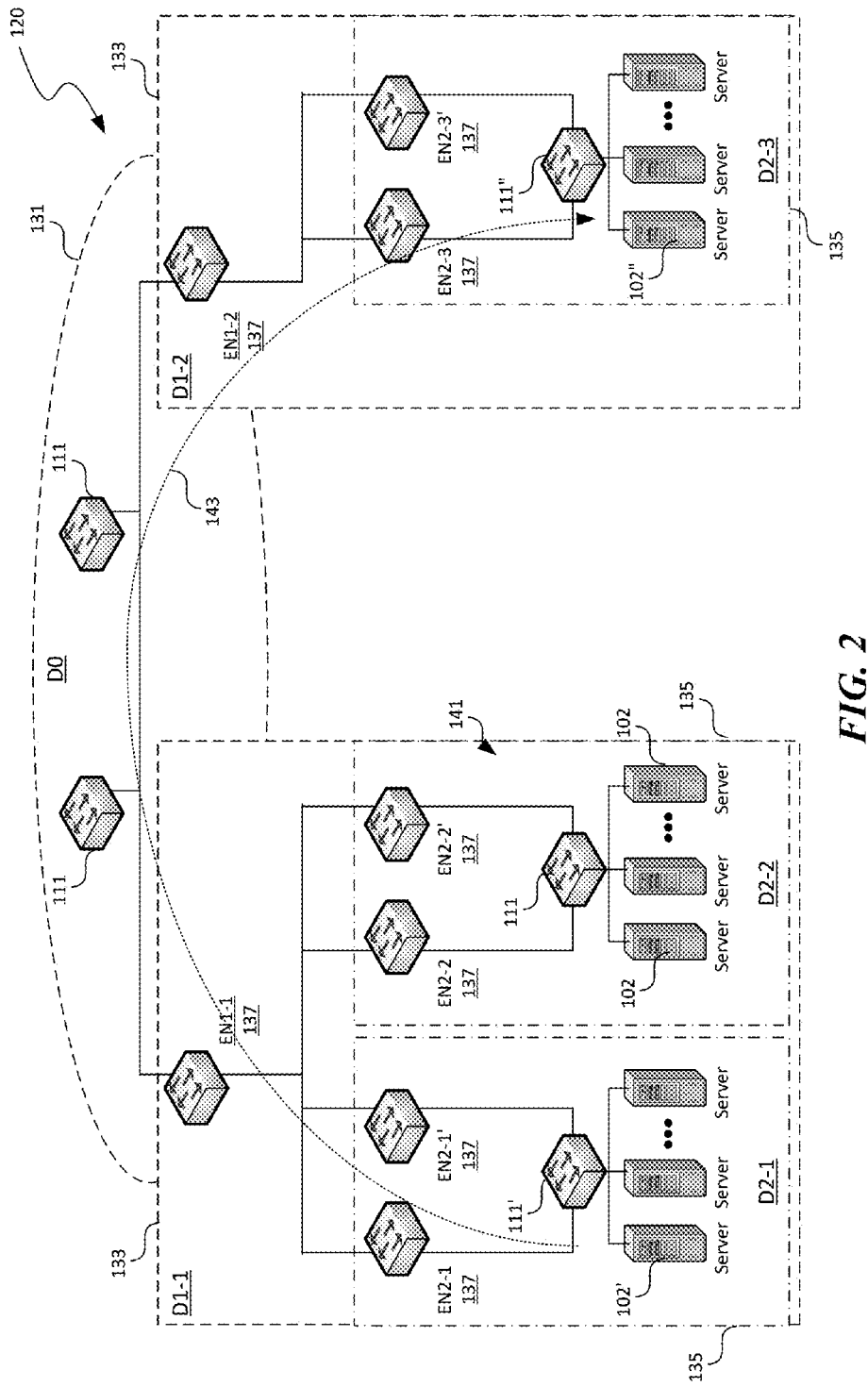
FIG. 2 is a schematic diagram illustrating an example hierarchical underlay network suitable for the computer network of FIG. 1 in accordance with embodiments of the disclosed technology.

FIG. 2 is a schematic diagram illustrating an example hierarchical underlay network 120 suitable for the computer network 100 of FIG. 1 in accordance with embodiments of the disclosed technology. Even though a particular arrangement of the underlay network 120 is shown in FIG. 2, various techniques of partitioning the overlay network 121 (FIG. 1) may be applied to other underlay networks having different arrangements of network nodes and/or end points than that shown in FIG. 2. Partitioning of the underlay network 120, in general, can be independent from the manner in which the overlay network 121 is partitioned and/or how the LRAGs 124 are assigned. As shown in FIG. 2, the underlay network 120 can include a core domain 131 having one or more network nodes 111. The underlay network 120 can also include one or more level-one domains 133. Two level-one domains 133 are shown in FIG. 2 for illustration purposes and are individually identified as domains D1-1 and D1-2. In the illustrated embodiment, the level-one domain D1-1 includes two level-two domains 135 (individually identified as D2-1 and D2-2). The level-one domain D1-2 includes one level-two domain D2-3. In other embodiments, the level-one domains 104 can include other suitable number of domains and/or end points.

The level-two domains 106 can individually include one or more end points 141 such as servers 102, one or more edge nodes 137, and one or more network nodes 111 connecting the end points 108 to the edge nodes 137. In one embodiment, the network nodes 111 can individually include a top-of-rack ("TOR") router or switch. In other embodiments, the network node 111 can include a bridge, a gateway, or other suitable communications device. In the illustrated embodiment, each of the level-two domains 135 includes two edge nodes 137 (e.g., edge nodes EN2-1 and EN2-1') forming an edge node group. In certain embodiments, the edge nodes 137 in an edge node group can be accessed randomly, for example, for non-traffic engineering type packets. In other embodiments, one of the edge nodes 137 in an edge node group can be particularly identified and specified to handle, for example, traffic engineering type packets. In further embodiments, the edge nodes 137 can be accessed in other suitable manners based on any other suitable criteria.

The hierarchical division shown in FIG. 2 can be applied to one or multiple data centers in various manners. For example, in certain embodiments, the hierarchical division shown in FIG. 2 can be applied to one data center with the core domain 131 including one or more T3 broadband switches of the data center. The level-one domains 133 can include T2 switches which are connected to level-two domains 135 having T1 and/or TOR switches. In other embodiments, the level-one domains 133 can include both T2 and T1 switches while the level-two domains 135 include the TOR switches. In another example, the hierarchical division shown in FIG. 2 can also be applied to multiple data centers. For instance, the core domain 131 can include a core network interconnecting multiple data centers and the T3 broadband switches. Within each data center, the level-one domains 133 can include the T2 switches while the level-two domains can include the T1 and/or TOR switches. In further examples, the division of the underlay network 120 can include additional and/or different domain levels.

In any of the foregoing embodiments, the edge nodes 137 can be configured to route communications to/from a higher level or a lower level domain along one or more network paths or tunnels 143. For example, a message from the server 102' in the level-two domain D2-1 to the server 102" in the level-two domain D2-3 can be routed via a tunnel 143 starting from the network node 111' to the edge nodes EN2-1 or EN2-1' and then to the level-one domain D1-1. The edge node EN1-1 of the level-one domain D1-1 can forward the message to the level-one domain D1-2 via one or more of the network nodes 111 of the core domain 131. The level-one domain D1-2 can then forward the message via the edge node EN1-2 to the edge nodes EN2-3 or EN2-3' of the level-two domain D2-3, which in turn forward the message to the server 102" via the network node 111'. In certain embodiments, the tunnel 143 may be pre-established, for example, with a network route pre-computed based on at least one of a source or destination address in the underlay network 120 according to, e.g., MPLS protocol. In other embodiments, the tunnel 143 may be computed, established, and/or otherwise formed on an ad hoc basis or in other suitable manners.

Figure 3:
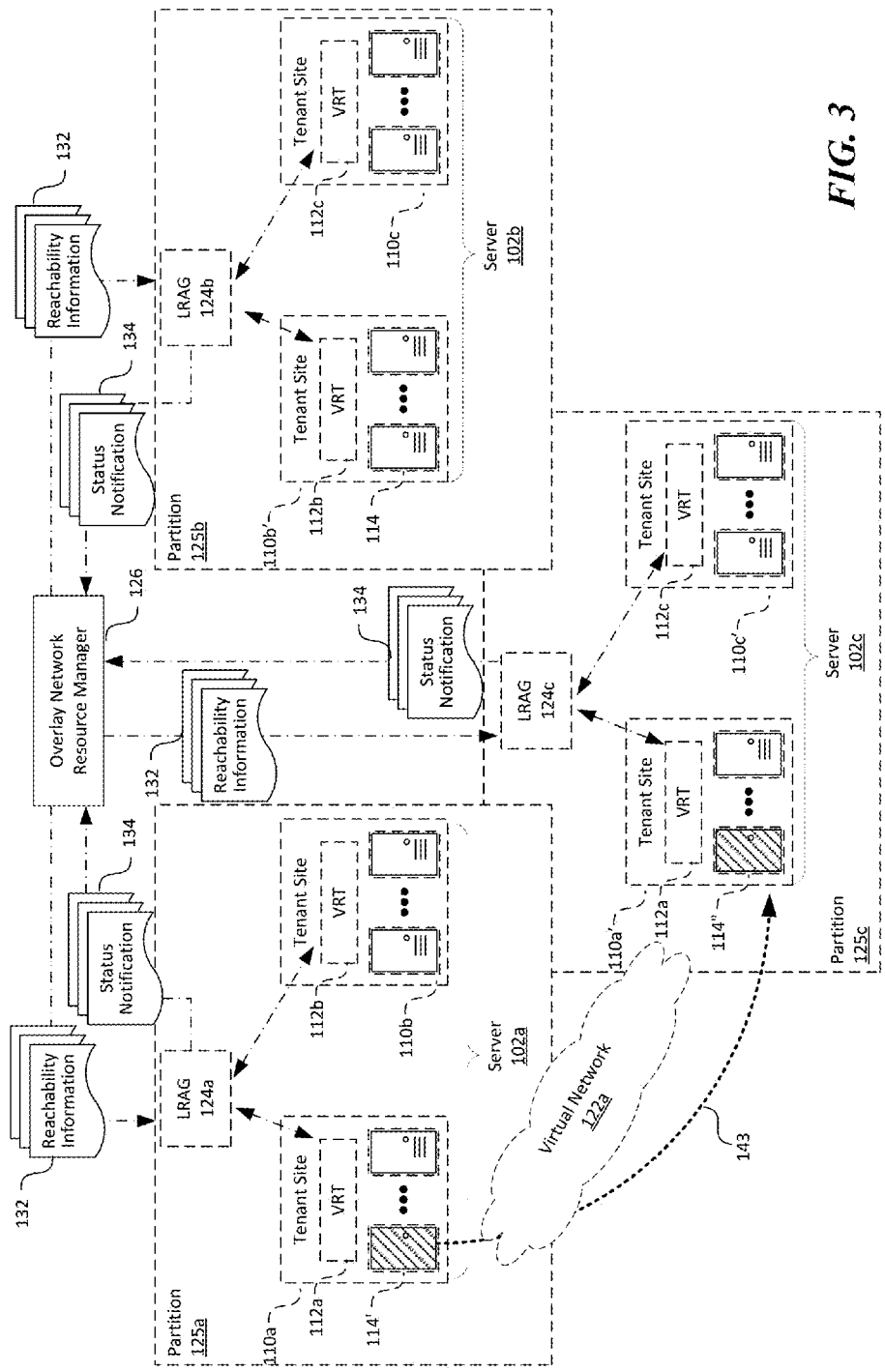
FIG. 3 is a schematic diagram illustrating example operations of the computer network in accordance with embodiments of the disclosed technology. Certain portions of the computer network in FIG. 1 is omitted for clarity.

FIG. 3 is a schematic diagram illustrating example operations of the computer network 100 in accordance with embodiments of the disclosed technology. Certain components of the computer network 100 are omitted from FIG. 3 for clarity. As shown in FIG. 3, the overlay network resource manager 126 can be configured to communicate to the LRAGs 124 information regarding any resource allocations, e.g., allocation of resources to the virtual machines 114, relocation of any virtual machines 114 and/or virtual network functions, or other suitable resource allocation operations. Based on such information, the individual LRAGs 124 can then configure, update, and/or otherwise manipulate the virtual machines 114, virtual network functions, and/or the VRTs 112 in corresponding virtual networks 122 for only virtual networks 122 that has at least one end point in a corresponding overlay partition 125.

To illustrate with an example, the overlay network resource manager 126 can be configured to inform the first LRAG 124a to instantiate a new virtual machine 114' and attach the instantiated virtual machine 114' to the first virtual network 122a. In one embodiment, the overlay network resource manager 126 informs the first LRAG 124a by transmitting reachability information 132. In other embodiments, the overlay network resource manager 126 can also inform the first LRAG 124a via an application programming interface and/or other suitable interfaces. In response to the reachability information 132, the first LRAG 124a (with the first hypervisor 107a in FIG. 1) can instantiate the requested virtual machine 114' and attach the virtual machine 114' to the first virtual network 122a. The first LRAG 124a can then transmit to the overlay network resource manager 126 a status notification 134 to report that the instantiation of the virtual machine 114' is completed and the virtual machine 114' is attached to the first virtual network 122a.

The overlay network resource manager 126 can then determine which overlay partition(s) 125 is impacted by the reported resource allocation and communicate suitable reachability information regarding the resource allocation to corresponding LRAG(s) 124 in the impacted overlay partition(s) 125. For instance, in the example above, the instantiated virtual machine 114' is attached to the first virtual network 122a, and thus the first and third overlay partitions 125a and 125c are impacted because they contain at least one end point of the first virtual network 122a. In contrast, the second overlay partition 125b is not impacted because it does not include any end point of the first virtual network 122a. The overlay network resource manager 126 can then transmit reachability information 132 regarding the instantiated virtual machine 114' to only those LRAGs 124 in the impacted overlay partitions 125 (e.g., the first and third LRAGs 124a and 124c) without transmitting the same information to LRAGs 124 (e.g., the second LRAG 124b) in non-impacted overlay partition(s).

Based on the transmitted reachability information, the first and third LRAGs 124a and 124c can then update the first and third VRT 112a and 112b to have a new or updated entry for the instantiated virtual machine 114'. For instance, an entry in the first VRT 112a can include a tenant address (e.g., a virtual network address) for the instantiated virtual machine 114' on the first virtual network 122a because the virtual machine 114' is local. A corresponding entry in the third VRT 112c can include the tenant address and an associated underlay location identifier that identifies, for example, the first server 102a, for the virtual machines 114'.

The overlay network resource manager 126 and the LRAGs 124 can also cooperate to seamlessly relocate one or more virtual machines 114 from one server 102 to another. For example, the virtual machine 114' hosted on the first server 102a (referred to below as the originating virtual machine 114') can be decided to be relocated from the first server 102a to the third server 102c. Reasons for such relocation can include load balancing, system upgrade and/or maintenance, user request, server failure, and/or other suitable reasons.

As an initial operation, the overlay network resource manager 126 prepares a target virtual machine 114" at the third server 102c by transmitting reachability information 132 to the third LRAG 124c. Based on the reachability information, the third LRAG 124c configures the VRT 112c in the NVE 109c (FIG. 1) of the first virtual network 122a. The third LRAG 124c then communicates with the third hypervisor 107c (FIG. 1) to setup and start the targeting virtual machine 114". If the third NVE 109c does not include any end points for the first virtual network 122a, a new tenant site 110 and VRT 112 for the targeting virtual machine 114" can be created. The VRT 112 can then be populated with information (e.g., addresses and/or network routes) based on information received by the third LRAG 124c from the overlay network resource manager 126. If the third NVE 109c already includes at least one end point of the first virtual network 122a, the targeting virtual machine 114" in the first tenant site 110a' can be attached to the first virtual network 122a.

The third LRAG 124c can then transmit a status notification 134 to the overlay network resource manager 126 and informs it that the preparation for the targeting virtual machine 114" is completed. In response, the overlay network resource manager 126 informs the first LRAG 124a to start migrating the originating virtual machine 114' to the targeting virtual machine 114" hosted on the third server 102c. In certain embodiments, relocation of the virtual machine 114' can include transmitting configuration, data, and/or other suitable information from the originating virtual machine 114' to the targeting virtual machine 114".

The relocation of the originating virtual machine 114' can be according to three scenarios referred to herein as hot, warm, or cold relocation. In a hot relocation, the originating virtual machine 114' is relocated from one server 102 to another while continuing to run and without being shut down and restarted at the new location. In a warm relocation, the originating virtual machine 114' is suspended with associated configuration saved in memory or a disk file, and later the virtual machine 114 is resumed once relocation is completed. In a cold relocation, the originating virtual machine 114' is shut down with associated configuration moved to the hypervisor 107 in the new host, and then the virtual machine 114' is restarted in the new location.

During such relocation, the originating virtual machine 114' can maintain its network state and connectivity information, for example, its tenant address (e.g., IP address in the first virtual network 122a) and/or its MAC address to prevent or at least reduce the risk of existing TCP sessions being interrupted and needing restart. However, the IP address of the new host (i.e., the third server 102c) in the underlay network 120 (FIG. 1) necessarily changes as the originating virtual machine 114' is relocated to the third server 102c.

In order to maintain the IP address of the originating virtual machine 114' in the first virtual network 122a, the address of the virtual machine 114' in the overlay network 121 is decoupled from the address of the same virtual machine 114 in the underlay network 120. For example, in certain embodiments, the originating virtual machine 114' can be identified by an end point identifier that includes a tenant virtual network identifier ("TVNI"), a tenant address ("TN"), and a underlay network address ("UNA") as TVNI/TA→UNA. The TVNI identifies a virtual network (e.g., the first virtual network 122a) to which the virtual machine 114' is attached to. The tenant address can include, for example, an IP address that identifies the virtual machine 114' on the first virtual network 122a. The underlay network address identifies the network node in the underlay network 120 (FIG. 1) on which the virtual machine 114' is hosted. In other embodiments, the virtual machine 114' can be identified in other suitable manners.

In response to the relocation, a portion of the end point identifier of the virtual machine 114' can be maintained and another portion can be adjusted. For example, in one embodiment, the TVNI/TA of the virtual machine 114' can be maintained such that the virtual machine 114' has the same address on the first virtual network 122a. However, the UNA can be adjusted to correspond to the third server 102c, which hosts the targeting virtual machine 114". Thus, the end point identifier of the virtual machine 114' can be adjusted from TVNI/TA→UNA to TVNI/TA→UNA', where UNA and UNA' correspond to addresses of the first and third servers 102a and 102c, respectively.

Continuing with the example above, in response to the status notification 134 from the third LRAG 124c, the overlay network resource manager 126 can transmit updated reachability information to LRAGs in overlay partitions 125 impacted by the relocation of the virtual machine 114'. LRAGs 124 associated with overlay partitions 125 that do not contain the impacted virtual networks 122 do not receive any updated reachability information. Based on the updated reachability information 132, each impacted LRAG 124 can then configure the corresponding VRTs 112 in the NVEs 109 in parallel, in series, or in other suitable manners. Each LRAG 124 operates independently from all other LRAGs 124 and is in charge of disseminating only the reachability information 132 to the relevant end points contained in the associated overlay partitions 125.

In certain embodiments, the originating LRAG (e.g., the first LRAG 124a) can also configure an originating point of a transition tunnel 143 through the underlay network 120 (FIG. 2) to a targeting point for reducing or even avoiding packet loss during relocation. A targeting LRAG 124 (e.g., the third LRAG 124c) can configure the targeting end point of the transition tunnel. The transition tunnel can include one or more network nodes 111 (FIG. 10 of the underlay network 120 through which the configuration, data, and/or other suitable information of the virtual machine 114' can be transmitted from an originating host (e.g., the first server 102a) to a targeting host (e.g., the third server 102c). In other embodiments, the transition tunnel can be established by other suitable entities.

In one embodiment, the transition tunnel 143 can be pre-established. For example, a pre-established tunnel can include a network path from the originating host to the targeting host. The path is established in the forwarding tables in the network nodes in the underlay network 120. If the underlay network 120 is hierarchically partitioned such as shown in FIG. 2, the transition tunnel from a server 102 to any other servers 102 can be pre-established in the underlay network 120 following, e.g., MPLS protocol. In one embodiment, the underlay network address is utilized to identify a desired network path in the underlay network 120. The identified network path may be different than the shortest network path computed by a corresponding routing protocol. In another embodiment, the underlay network address can be used to identify network paths that can be used. In other embodiments, a combination of at least some of the tenant virtual network identifier, a tenant address, or a underlay network address can be utilized to identify the desired network path in the underlay network 120.

When the underlay network address is used to identify a network path, the same underlay network address can identify the service chaining for a packet that is forwarded by the underlay network 120, if needed. The overlay network packet when transported through the underlay network 120 may be required to undergo through a sequence of one or more physical and/or virtualized network functions. Examples of such network functions can include firewalls, name servers, load balancers, and/or other suitable functions, and are commonly referred to as service chaining. Because the underlay network address identifies a specific path through the underlay network 120, the same underlay network address can also be used to select or identify a specific path traversing the network nodes implementing certain network functions in a desired sequence.

The overlay network resource manager 126 can determine the underlay network address and/or a network path to be used for the transition tunnel 143 and communicates the underlay network address and/or the network path to the first LRAG 124a associated to the originating host. In certain embodiments, the overlay network resource manager 126 can identify the network path by transmitting to the originating host certain reachability information of the target host (e.g., an underlay network address thereof). In other embodiments, the network path may be identified in other suitable manners. Once the underlay network address and/or the network path is determined, tunneling operation at the originating host (e.g., the first server 102a) can begin. In certain embodiments, the first server 102a can encapsulate packets associated with the relocated virtual machine 114' (or VNF) using the underlay network address and forward the encapsulated packets through the underlay network 120 to the targeting virtual machine 114". As such packet loss during virtual machine relocation can be reduced or even avoided.

Eventually, the transition tunnel may not be needed anymore because the VRTs 112 of the impacted virtual network 122 (e.g., the first virtual network 122a) are all updated independently with the new end point identifier values. Thus, messages to the relocated virtual machine 114' can be transmitted directly to the target virtual machine 114". The transition tunnel can include an entry in the VRT 112 of the virtual network 122 at the originating NVE 109. Thus, the transition tunnel can be eliminated after a select period of time, for example by using a timer to eliminate the entry in the VRT 112.

Even though the virtual machine relocation described above involves only one virtual machine 114', in other embodiments, generally similar or the same operations may be performed to move a plurality of virtual machines and/or virtual network functions in a batch mode. For example, the foregoing operations may be repeated to relocate multiple or all virtual machines 114 from one physical server 102 to another, from servers 102 in a physical location to those in a different physical location, or from servers 102 in a data center to those in a different data center. In another example, multiple or all virtual machines 114 may be associated as a group to a physical or virtualized network function, such as a software load balancer. In such an example, if the software load balancer is moved, it may be desirable to move multiple or all of the associated virtual machines 114 together with the software load balancer, for example to keep the virtual machines 114 residing in servers 102 physically close to the software load balancer. In other examples, the foregoing operations may be performed in other suitable manners to achieve batch relocation of virtual machines and/or virtual network functions.

Figure 4:
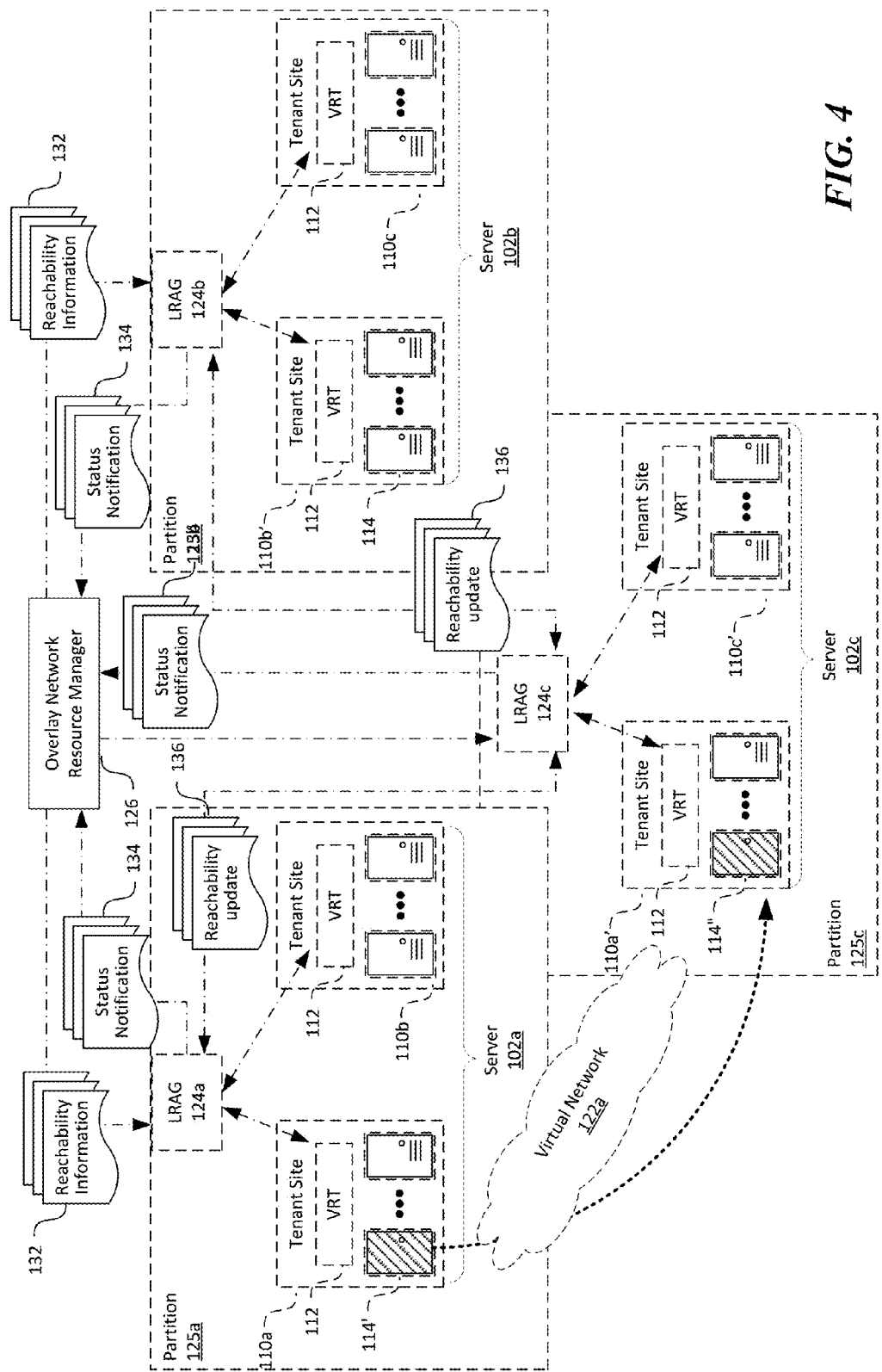
FIG. 4 is a schematic diagram illustrating example operations of the computer network in accordance with additional embodiments of the disclosed technology. Certain portions of the computer network in FIG. 1 is omitted for clarity.

In the description above with reference to FIG. 3, the overlay network resource manager 126 disseminates the updated reachability information 132 regarding relocation of a virtual machine 114 to individual impacted LRAGs 124. However, in other embodiments, such dissemination can be performed by other suitable entities. For example, as shown in FIG. 4, once an LRAG 124 has configured the VRT 112 in the appropriate server 102 hosting the virtual machine 114 or virtual network function, each LRAG 124 can announce the updated reachability information 132 to other LRAGs 124 using a routing protocol such as the Border Gateway Protocol ("BGP"). In certain embodiments, the new routes may be announced only to those LRAGs 124 associated with overlay partitions 125 containing endpoints for the virtual network 122 to which the virtual machines 114 or virtual network functions are attached to by using route filtering among the LRAGs 124. An originating LRAG 124 (e.g., the first LRAG 124a) can determine other LRAGs 124 impacted by the relocation using, for example, route filtering techniques, such as the Route Target (RT) feature in BGP. The originating LRAG 124 can then transmit the updated reachability information 132 to those impacted LRAGs 124. Each LRAG 124 can also announce the new reachability information to other NVEs 109 in corresponding overlay partitions 125 containing endpoints of the virtual network 122 to which the virtual machines 114 or virtual network functions are attached to (if any). The NVEs 109 can be logically interconnected to corresponding LRAGs 124 as clients, and the LRAG 124 can only announces routes based on route filtering or other suitable techniques. In other embodiments, the originating LRAG 124 can broadcast to all the other LRAGs 124 the updated reachability information 132. In turn, the other LRAGs 124 can individually determine whether the updated reachability information 132 impacts any end points contained in a corresponding overlay partition 125. Based on the determination, the other LRAGs 124 can update corresponding VRTs 112 and/or NVEs 109 (FIG. 1) accordingly.

Figure 5:
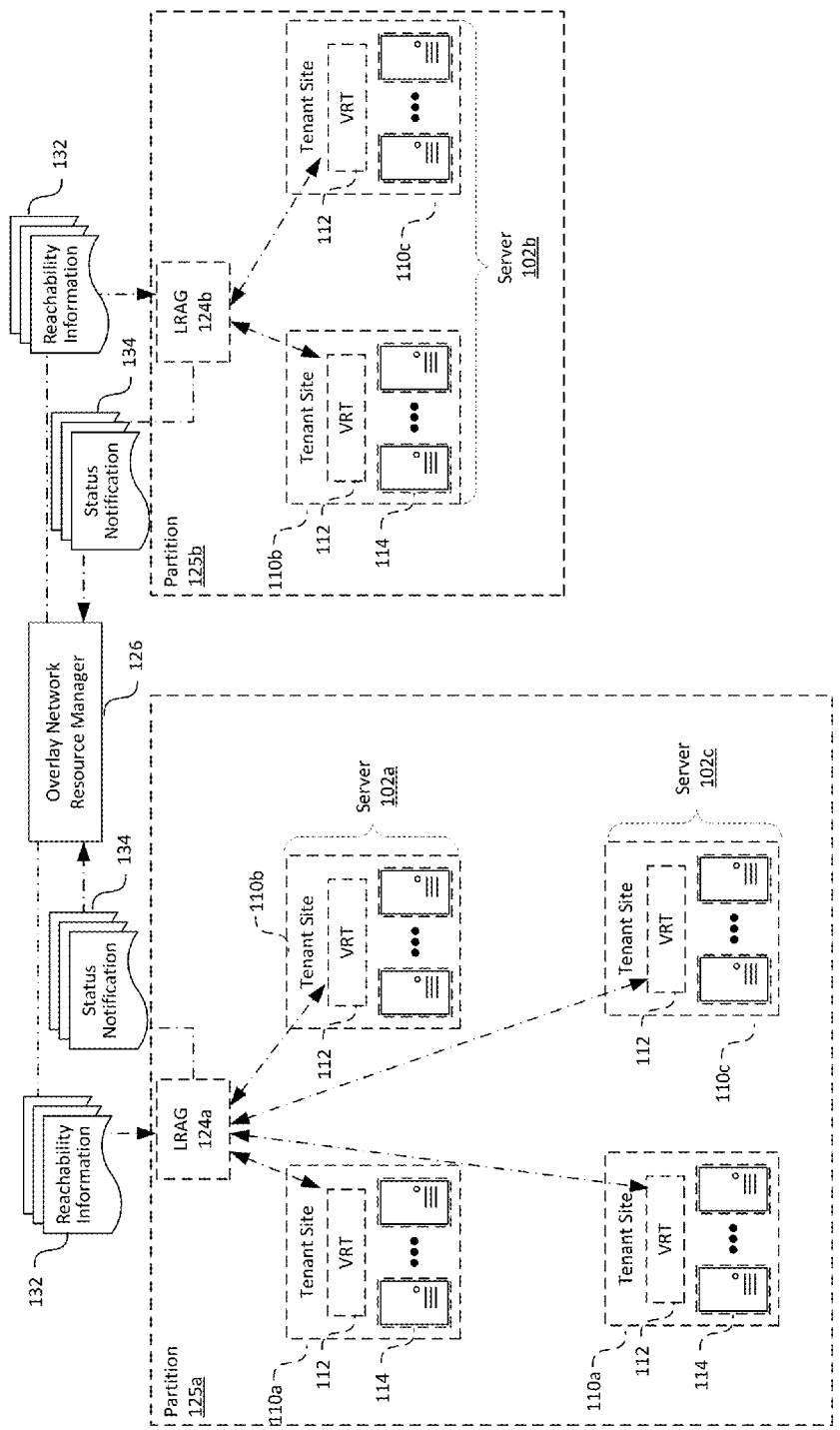
FIG. 5 is a schematic diagram illustrating example operations of the computer network in accordance with further embodiments of the disclosed technology. Certain portions of the computer network in FIG. 1 is omitted for clarity.

In FIGS. 1-4, each of the servers 102 is shown as in a corresponding overlay partition 125 with a corresponding LRAG 124. However, as discussed above, the overlay partitions 125 may be divided on other suitable basis. For example, as shown in FIG. 5, the first overlay partition 125a can include the first LRAG 124a interconnected to both the first server 102a and the third server 102c. The second overlay partition 125b can include the second LRAG 124b interconnected to the second server 102b. In further embodiments, the servers 102 and/or the LRAGs 124 may have other suitable arrangements and/or configurations. Even though the migration of the virtual machine 114 with reference to FIGS. 3-5 is described above in the context of the overlay partitions 125, in other embodiments, the foregoing migration technique utilizing the transition tunnel 143 may also be implemented in computer networks that do not include a partitioned overlay network, that include a partially partitioned overlay network, or that include other suitable arrangements in overlay and/or underlay networks.

Figure 6:
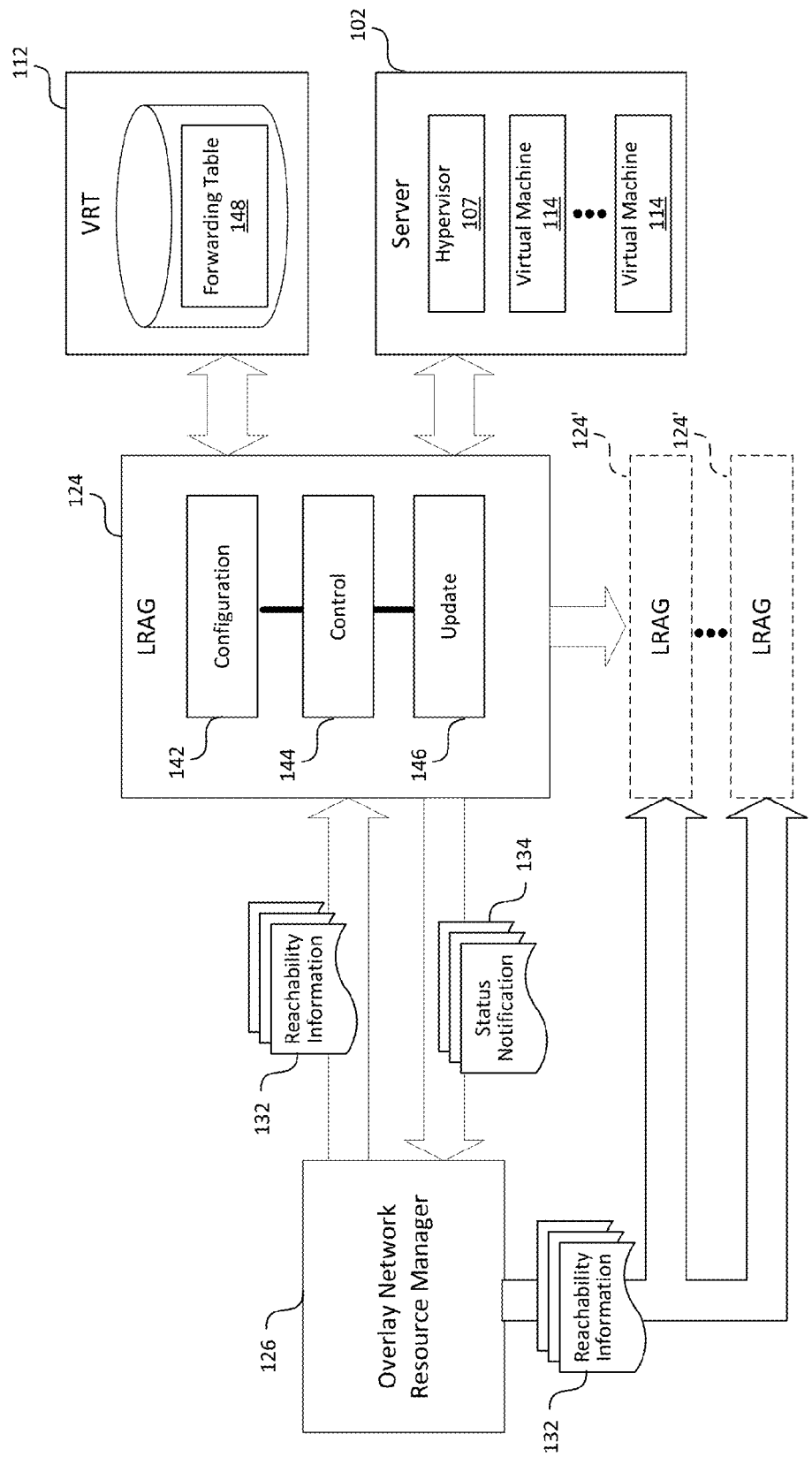
FIG. 6 is a block diagram illustrating software components of a local reachability access gate in accordance with embodiments of the disclosed technology.

FIG. 6 is a block diagram illustrating example software components of a LRAG 124 suitable for the computer network 100 of FIG. 1 in accordance with embodiments of the disclosed technology. As shown in FIG. 6, the LRAG 124 can include a configuration component 142, a control component 144, and an optional update component 146 interconnected to one another. Each of the components 142, 144, and 146 can be a computer program, procedure, or routine written as source code in a conventional programming language, or one or more modules may be hardware modules. Even though only the foregoing components are shown in FIG. 6, in other embodiments, the LRAG 124 can also include one or more of an input component, an output component, a network component, and/or other suitable components.

The configuration component 142 can be configured to populate, update, and/or otherwise manage VRTs 112 in corresponding overlay partitions 125 (FIG. 1) based on reachability information 132 received from the overlay network resource manager 126. For example, as shown in FIG. 6, the configuration component 142 can generate, update, or otherwise manage entries in a forwarding table 148 in the VRT 112 based on a mapping of network nodes in the reachability information 132. In certain embodiments, entries in the forwarding table 148 can individually include a source address of a source network node, a destination address of a destination network node, and/or one or more network paths between the source and destination network nodes via, for example, the underlay network 120 of FIG. 2. In other embodiments, the entries in the forwarding table 148 may include identification of a network node 111 (FIG. 2), an edge node 137 (FIG. 2), a domain 133 or 135 (FIG. 2), and/or other suitable network entities that form at least a portion of a route from the source to the destination network nodes.

The control component 144 can be configured to control the hypervisor 107 in managing virtual machines 114. For example, in one embodiment, the control component 144 can instruct the hypervisor 107 to instantiate a new virtual machine 114 and attach the instantiated virtual machine 114 to a virtual network 122 (FIG. 1) based on the received reachability information 132. In another example, the control component 144 can instruct the hypervisor 107 to suspend, terminate, and/or otherwise manipulate one of the virtual machines 114 based on the received reachability information 132. In further examples, the control component 144 may cause the hypervisor 107 to perform a combination of the foregoing operations and/or other suitable operations.

In one embodiment, the update component 146 can be configured to provide a status notification 134 to the overlay network resource manager 126. The status notification 134 can include information that informs the overlay network resource manager 126 regarding completion of instantiation, suspension, termination, and/or other suitable operations related to a virtual machine 114. In other embodiments, the update component 146 may also announce updated reachability information 132 to other LRAGs 124' (shown in phantom lines for clarity).

In operation, the overlay network resource manager 126 can transmit the reachability information 132 to the LRAG 124. Based on the received reachability information 132, the configuration component 142 can configure the forwarding table 148 in the VRT 112. In certain embodiments, the control component 144 can also instantiate, suspend, terminate, or otherwise manipulate one or more of the virtual machines 114 hosted on the server 102 based on the received reachability information 132. Once the control component 144 completes manipulation of the virtual machines 114, the update component 146 can transmit the status notification 134 to the overlay network resource manager 126 informing it the completion. In response, in certain embodiments, the overlay network resource manager 126 can then transmit the updated reachability information 132 to the other impacted LRAGs 124'. In other embodiments, the LRAG 124 can announce the updated reachability information 132 directly to the other LRAGs 124'.

Figure 7:
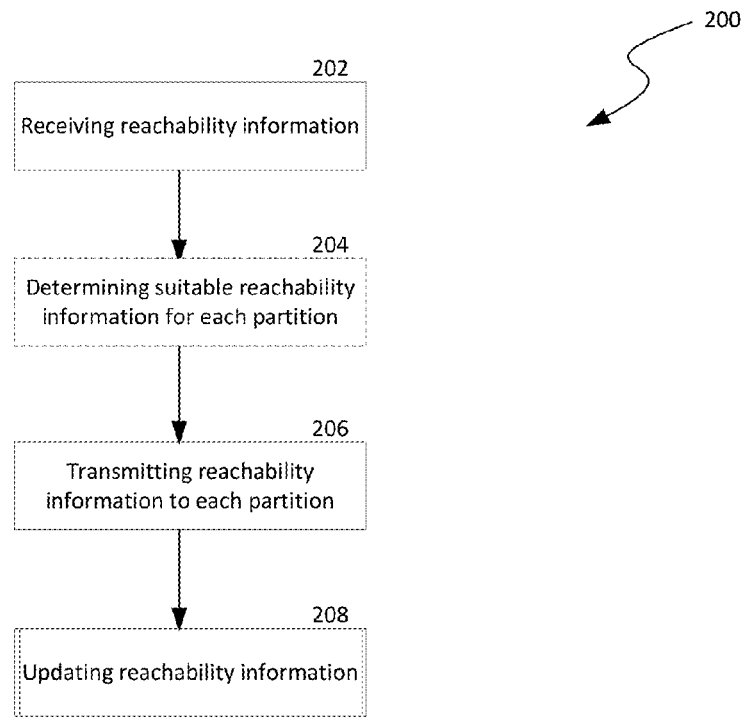
FIG. 7 is a flowchart illustrating a process of updating reachability information in the computer network of FIG. 1 in accordance with embodiments of the disclosed technology.

FIG. 7 is a flowchart illustrating a process 200 of updating reachability information in the computer network 100 of FIG. 1 in accordance with embodiments of the disclosed technology. As shown in FIG. 7, the process 200 can include receiving reachability information at stage 202. In one embodiment, the reachability information may be received from a database containing records of mappings between virtual and corresponding physical network nodes. In other embodiments, the reachability information may be obtained in other suitable manners.

In certain embodiments, the process 200 can include an optional stage 204 in which a subset of suitable reachability information for each overlay partition of an overlay network is determined. In one embodiment, the subset of reachability information includes reachability information related to virtual network(s) that include at least one end point in a corresponding overlay partition. For virtual network(s) that does not include at least one end point in the corresponding overlay partition, the reachability information related to such virtual network(s) is excluded from the subset. The process 200 can then include transmitting the determined suitable reachability information to an LRAG in each overlay partition at stage 206. In response, the LRAG in each overlay partition may then update one or more virtual routing tables related to the virtual networks having at least one end point in the particular overlay partition. In other embodiments, the optional stage 204 may be omitted, and the same reachability information may be transmitted to all overlay partitions. In response, each overlay partition can determine the subset of reachability information for virtual networks that have at least one end point in each overlay partition. In yet other embodiments, each LRAG can subscribe to, for example, the overlay network resource manager 126 of FIG. 1, for receiving suitable reachability information corresponding to one or more virtual networks. In further embodiments, a combination of the foregoing determination operations may be utilized, for example, by determining a first subset before transmission and determining a second subset from the first subset at each overlay partition. The process 200 can also include updating the reachability information at stage 208, as described in more detail below with reference to FIG. 8.

Figure 8:
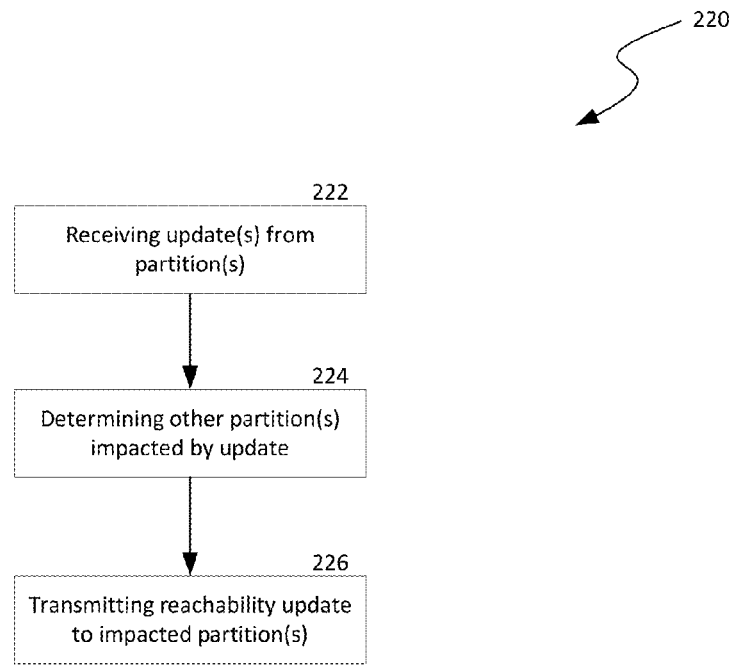
FIG. 8 is a flowchart illustrating another process of updating reachability information in the computer network of FIG. 1 in accordance with embodiments of the disclosed technology.

FIG. 8 is a flowchart illustrating a process 220 of updating reachability information in the computer network 100 of FIG. 1 in accordance with embodiments of the disclosed technology. As shown in FIG. 8, the process 200 can include receiving status update(s) from overlay partition(s) at stage 222. The update can include one or more of a completion notification of instantiate, starting, suspending, terminating, and/or other suitable operations of a virtual machine and/or a virtual network function. The process 220 can then include determining one or more other overlay partitions impacted by the received status update(s). In one embodiment, an overlay partition is impacted if the overlay partition includes a virtual network having at least one end point affected by the update(s). In other embodiments, the impacted overlay partitions may be determined based on other suitable criteria. The process 220 can then include transmitting reachability update(s) to only the impacted overlay partition(s) at stage 226. Other overlay partitions not impacted do not receive the reachability update(s).

Figure 9:
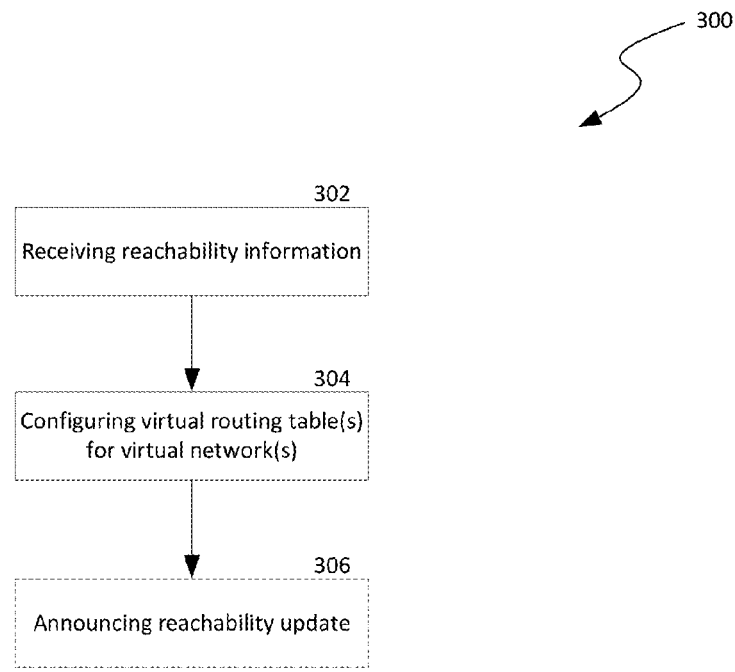
FIG. 9 is a flowchart illustrating a process of managing reachability information in an overlay partition in accordance with embodiments of the disclosed technology.

FIG. 9 is a flowchart illustrating a process 300 of managing reachability information in an overlay partition in accordance with embodiments of the disclosed technology. As shown in FIG. 9, the process 300 includes receiving reachability information at stage 302. The received reachability information is only for virtual networks having at least one end point in the overlay partition. The process 300 can then include configuring virtual routing tables for the virtual networks in the overlay partition at stage 304. Optionally, the process 300 can also include announcing reachability updates to the overlay network resource manager 126 of FIG. 1, other overlay partitions (not shown), and/or other suitable entities.

Figure 10:
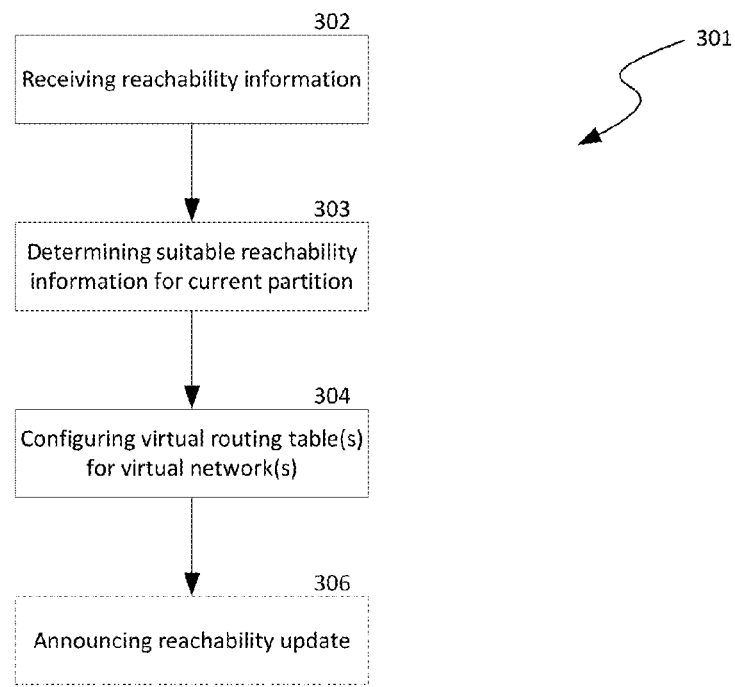
FIG. 10 is a flowchart illustrating another process of managing reachability information in an overlay partition in accordance with embodiments of the disclosed technology.

FIG. 10 is a flowchart illustrating another process 301 of managing reachability information in an overlay partition in accordance with embodiments of the disclosed technology. The operations of the process 301 can be generally similar to those of the process 300 in FIG. 9 except the process 301 includes determining suitable reachability information for current overlay partition at stage 303. The suitable reachability information can include information related only to virtual networks with at least one end point in the overlay partition. In other embodiments, the process 301 can also include determining suitable reachability information for other overlay partitions and disseminating the determined suitable reachability information following, for example, suitable routing protocols.

Figure 11:
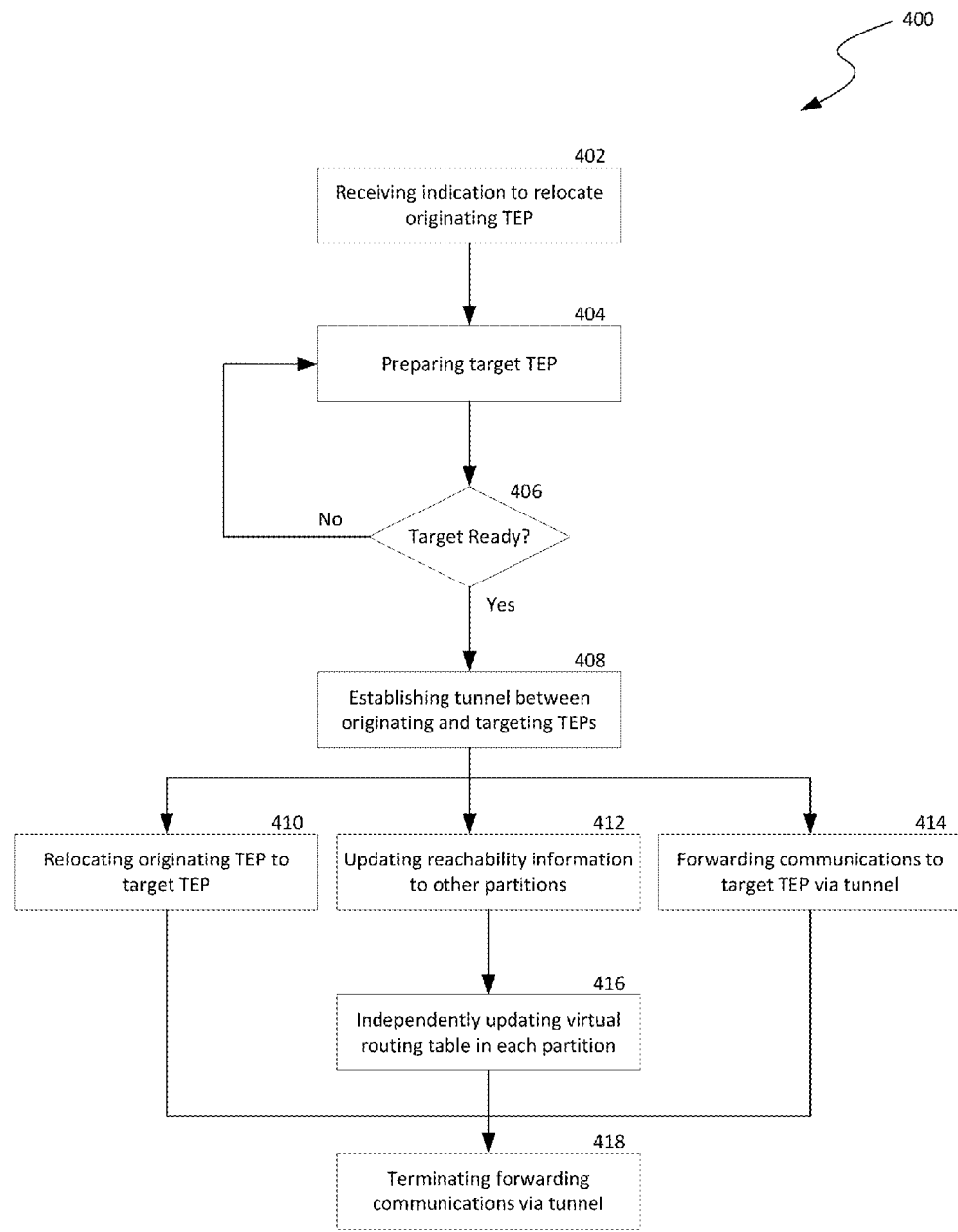
FIG. 11 is a flowchart illustrating a process of relocating a virtual tenant end point in accordance with embodiments of the disclosed technology.

FIG. 11 is a flowchart illustrating a process 400 of relocating a virtual tenant end point ("TEP") in accordance with embodiments of the disclosed technology. As shown in FIG. 11, the process 400 includes receiving an indication to relocate an originating TEP at stage 402. The originating TEP can include a virtual machine, a virtual network function, and/or other suitable entities. The process 400 can then include preparing a target TEP at stage 404. The target TEP may be prepared by instantiating, starting, and/or otherwise generating the target TEP attached to a virtual network containing the originating TEP. The process 400 can include a decision stage 406 to determine if the target TEP is ready. If the target TEP is not ready, the process 400 reverts to preparing the target TEP at stage 404.

If the target TEP is ready, the process 400 proceeds to establishing a tunnel between the originating and target TEPs at stage 408. In certain embodiments, the tunnel may be pre-established, for example, by pre-determining one or more network paths between the network nodes corresponding to the originating and targeting TEPs. For instance, the tunnel may be pre-determined based on a network address of a network node hosting the target TEP according to the MPLS protocol. In other embodiments, the tunnel may be established on an ad hoc basis by, for example, computing a network path based on the originating and/or target TEP addresses.

The process 400 can then include relocating the originating TEP to the target TEP via the tunnel at stage 410. In one embodiment, relocating the originating TEP to the target TEP can include a hot, warm, or cold migration of a virtual machine. In other embodiments, the relocating can include other suitable types of migrations. The process 400 can also include updating reachability information of the relocated originating TEP to other overlay partitions at stage 412. In certain embodiments, the updated reachability information is only transmitted to other overlay partitions having at least one end points of the virtual network containing the originating TEP by an LRAG in an overlay partition associated with the target TEP, by the overlay network resource manager 126 of FIG. 1, a combination of the foregoing components, or other suitable components of the computer network 100 (FIG. 1). In other embodiments, the updated reachability information is transmitted to all other overlay partitions. The process 400 then includes independently updating virtual routing tables in each of the virtual partitions having at least one end points of the virtual network containing the originating TEP at stage 416.

The process 400 can also include forwarding communications destined to the originating TEP to the target TEP via the established tunnel for at least a period of time at stage 414 and terminating the forwarding after the period of time has expired. In the illustrated embodiment, the stages 410, 412, and 414 are shown as being parallel to one another. In other embodiments, the foregoing operations may be performed in series or in other suitable manners.

Figure 12:
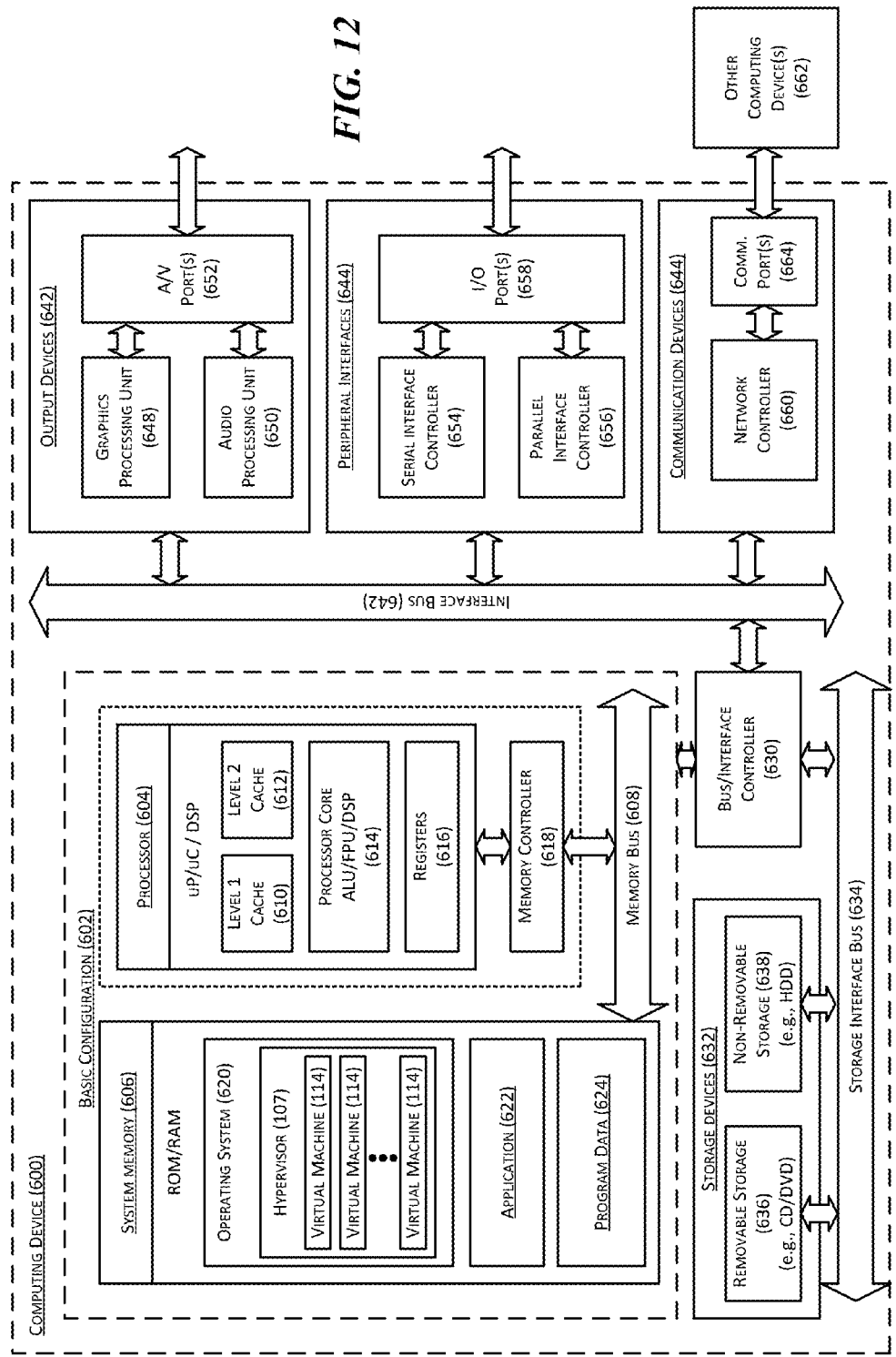
FIG. 12 is a computing device suitable for certain components of the computer network in FIG. 1.

FIG. 12 is a computing device 600 suitable for certain components of the computer network 100 in FIG. 1. For example, the computing device 600 can be suitable for the servers 102, the overlay network resource manager 126, or the LRAGs 124 of FIG. 1. In a very basic configuration 602, computing device 600 typically includes one or more processors 604 and a system memory 606. A memory bus 608 can be used for communicating between processor 604 and system memory 606.

Depending on the desired configuration, the processor 604 can be of any type including but not limited to a microprocessor (µP), a microcontroller (µC), a digital signal processor (DSP), or any combination thereof. The processor 604 can include one more levels of caching, such as a level-one cache 610 and a level-two cache 612, a processor core 614, and registers 616. An example processor core 614 can include an arithmetic logic unit (ALU), a floating point unit (FPU), a digital signal processing core (DSP Core), or any combination thereof. An example memory controller 618 can also be used with processor 604, or in some implementations memory controller 618 can be an internal part of processor 604.

Depending on the desired configuration, the system memory 606 can be of any type including but not limited to volatile memory (such as RAM), non-volatile memory (such as ROM, flash memory, etc.) or any combination thereof. The system memory 606 can include an operating system 620, one or more applications 622, and program data 624. As shown in FIG. 12, the operating system 620 can include a hypervisor 107 for managing one or more virtual machines 114. This described basic configuration 602 is illustrated in FIG. 12 by those components within the inner dashed line.

The computing device 600 can have additional features or functionality, and additional interfaces to facilitate communications between basic configuration 602 and any other devices and interfaces. For example, a bus/interface controller 630 can be used to facilitate communications between the basic configuration 602 and one or more data storage devices 632 via a storage interface bus 634. The data storage devices 632 can be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 606, removable storage devices 636, and non-removable storage devices 638 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 600. Any such computer readable storage media can be a part of computing device 600. The term "computer readable storage medium" excludes propagated signals and communication media.

The computing device 600 can also include an interface bus 640 for facilitating communication from various interface devices (e.g., output devices 642, peripheral interfaces 644, and communication devices 646) to the basic configuration 602 via bus/interface controller 630. Example output devices 642 include a graphics processing unit 648 and an audio processing unit 650, which can be configured to communicate to various external devices such as a display or speakers via one or more A/V ports 652. Example peripheral interfaces 644 include a serial interface controller 654 or a parallel interface controller 656, which can be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which can be arranged to facilitate communications with one or more other computing devices 662 over a network communication link via one or more communication ports 664.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 600 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method for migrating a virtual machine in a computer network having an overlay network having a plurality of virtual networks and implemented over an underlay network having a plurality of network nodes, the method comprising:
   receiving an indication to migrate the virtual machine in a virtual network of the overlay network from an originating network node of the underlay network to a target network node of the underlay network, the virtual machine having an address in the virtual network, wherein the target network node has a underlay network address in the underlay network;
   establishing a network tunnel in the underlay network from the originating network node to the target network node in response to receiving the indication to migrate the virtual machine, the network tunnel in the underlay network being identified by the underlay network address of the target network node in the underlay network; and
   migrating the virtual machine from the originating network node to the target network node following the established network tunnel in the underlay network while maintaining the address of the migrated virtual machine in the virtual network, wherein migrating the virtual machine includes:
   encapsulating packets of the migrated virtual machine with the underlay network address of the target network node;
   forwarding the encapsulated packets through the underlay network to the target network node: and
   during migration of the virtual machine, forwarding one or more messages from another virtual machine in the virtual network destined to the migrated virtual machine from the originating network node to the target network node along the same established network tunnel in the underlay network through which the virtual machine is migrated.

2. The method of claim 1, further comprising forwarding messages destined to the virtual machine from the originating network node to the target network node along the established network tunnel for a period of time after migrating the virtual machine from the originating network node to the target network node.

3. The method of claim 1, further comprising:
   receiving messages destined for the migrated virtual machine at the originating network node after migrating the virtual machine from the originating network node to the target network node:
   encapsulating the received messages with routing information identifying the established network tunnel; and
   forwarding the encapsulated messages to the target network node following the network tunnel.

4. The method of claim 1, further comprising:
   receiving messages destined for the migrated virtual machine at the originating network node after migrating the virtual machine from the originating network node to the target network node:
encapsulating the received messages with routing information identifying the established network tunnel, the routing information including a label corresponding to the established network tunnel; and
forwarding the encapsulated messages to the target network node following the network tunnel.

5. The method of claim 1, further comprising:
forwarding messages destined for the migrated virtual machine for a period of time after migrating the virtual machine from the originating network node to the target network node: and demolish the network tunnel after the period of time expires.

6. A computing system having a processor and a memory coupled to the processor, the memory containing instructions that when executed by the processor, cause the processor to perform a method comprising:
receiving an indication to migrate a virtual machine in a virtual network from a first network node of a underlay network to a second network node of the underlay network, the virtual network being implemented over the underlay network having a plurality of network nodes, wherein the second network node has a underlay network address in the underlay network;
in response to receiving the indication to migrate the virtual machine, determining a network path in the underlay network between the first and second network nodes, the determined network path in the underlay network being identified by the underlay network address of the second network node in the underlay network;
migrating the virtual machine from the first network node to be hosted by the second network node following the determined network path in the underlay network, wherein migrating the virtual machine includes:
encapsulating packets of the migrated virtual machine with the underlay network address of the second network node; and
forwarding the encapsulated packets through the underlay network to the second network node; and
during migration of the virtual machine, forwarding one or more messages from another virtual machine in the virtual network destined to the migrated virtual machine from the first network node to the second network node along the same determined network path in the underlay network through which the virtual machine is migrated from the first network node to the second network node.

7. The computing system of claim 6 wherein migrating the virtual machine includes:
performing at least one of instantiating, starting, or attaching to the virtual network a target virtual machine based on the received indication at the second network node;
providing an indication of successful completion of the at least one of instantiating, starting, or attaching to the virtual network a target virtual machine; and
in response to the indication of successful completion, migrating the virtual machine from the first network node to the second network node.

8. The computing system of claim 6 wherein migrating the virtual machine includes:
performing at least one of instantiating, starting, or attaching to the virtual network a target virtual machine based on the received indication at the second network node;
providing an indication of successful completion of the at least one of instantiating, starting, or attaching to the virtual network a target virtual machine; and
in response to the indication of successful completion, determining the network path in the underlay network between the first and second network nodes.

9. The computing system of claim 8 wherein determining the network path includes configuring an entry in a routing table associated with the virtual network, the entry identifies the network path from the first network node to the second network node.

10. The computing system of claim 9 wherein forwarding the one or more messages includes forwarding the one or more messages from the other virtual machine in the virtual network to the migrated virtual machine from the first network node to the second network node based on the configured entry in the routing table.

11. The computing system of claim 8 wherein:
determining the network path includes configuring an entry in a routing table associated with the virtual network, the entry identifies the network path from the first network node to the second network node; and
maintaining the configured entry in the routing table after the virtual machine is migrated from the first network node to the second network node.

12. The computing system of claim 8 wherein:
determining the network path includes configuring an entry in a routing table associated with the virtual network, the entry identifies the network path from the first network node to the second network node;
maintaining the configured entry in the routing table for a predetermined period of time after the virtual machine is migrated from the first network node to the second network node;
continuing forwarding the one or more messages from the other virtual machine in the virtual network to the migrated virtual machine from the first network node to the second network node based on the configured entry; and
removing the configured entry from the routing table after the predetermined period of time expires.

13. A method for migrating a virtual machine in a computer network having an overlay network having one or more virtual networks and implemented over an underlay network having a plurality of network nodes, the method comprising:
receiving an indication to migrate the virtual machine from a first network node of the underlay network to a second network node of the underlay network, wherein the second network node has a underlay network address in the underlay network;
in response to receiving the indication to migrate the virtual machine, determining a network path between the first and second network nodes in the underlay network;
migrating the virtual machine from the first network node to the second network node following the determined network path in the underlay network, wherein migrating the virtual machine includes:
encapsulating packets of the migrated virtual machine; and
forwarding the encapsulated packets through the underlay network to the second network node; and
during migration of the virtual machine, forwarding one or more messages from another virtual machine in the virtual network destined to the migrated virtual machine from the first network node to the second network node along the same determined network path in the underlay network through which the virtual machine is migrated from the first network node to the second network node.

14. The method of claim 13 wherein the determined network path in the underlay network is identified by the underlay network address of the second network node in the underlay network.

15. The computing system of claim 13 wherein migrating the virtual machine includes:
performing at least one of instantiating, starting, or attaching to the virtual network a target virtual machine based on the received indication at the second network node;
providing an indication of successful completion of the at least one of instantiating, starting, or attaching to the virtual network a target virtual machine; and
in response to the indication of successful completion, migrating the virtual machine from the first network node to the second network node.

16. The method of claim 13 wherein migrating the virtual machine includes:
performing at least one of instantiating, starting, or attaching to the virtual network a target virtual machine based on the received indication at the second network node;
providing an indication of successful completion of the at least one of instantiating, starting, or attaching to the virtual network a target virtual machine; and
in response to the indication of successful completion, determining the network path in the underlay network between the first and second network nodes.

17. The method of claim 13 wherein determining the network path includes configuring an entry in a routing table associated with the virtual network, the entry identifies the network path from the first network node to the second network node.

18. The method of claim 17 wherein forwarding the one or more messages includes forwarding the one or more messages from the other virtual machine in the virtual network to the migrated virtual machine from the first network node to the second network node based on the configured entry in the routing table.

19. The method of claim 13 wherein:
determining the network path includes configuring an entry in a routing table associated with the virtual network, the entry identifies the network path from the first network node to the second network node; and
the method further includes maintaining the configured entry in the routing table after the virtual machine is migrated from the first network node to the second network node.

20. The method of claim 13 wherein:
determining the network path includes configuring an entry in a routing table associated with the virtual network, the entry identifies the network path from the first network node to the second network node;
maintaining the configured entry in the routing table for a predetermined period of time after the virtual machine is migrated from the first network node to the second network node;
continuing forwarding the one or more messages from the other virtual machine in the virtual network to the migrated virtual machine from the first network node to the second network node based on the configured entry; and
removing the configured entry from the routing table after the predetermined period of time expires.

* * * * *